(12) United States Patent
Aoyama

(10) Patent No.: US 7,706,093 B2
(45) Date of Patent: Apr. 27, 2010

(54) PERPENDICULAR MAGNETIC RECORDING MEDIUM, MANUFACTURING METHOD THEREOF AND MAGNETIC RECORDING DEVICE

(75) Inventor: Nobuhide Aoyama, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 410 days.

(21) Appl. No.: 11/897,464

(22) Filed: Aug. 30, 2007

(65) Prior Publication Data

US 2008/0074784 A1   Mar. 27, 2008

(30) Foreign Application Priority Data

Sep. 21, 2006   (JP) .............................. 2006-256343

(51) Int. Cl.
   *G11B 5/02*   (2006.01)
(52) U.S. Cl. ...................................... 360/57
(58) Field of Classification Search ............. 360/57, 360/77.12, 75, 125.02, 17, 66, 77.04, 99.08
   See application file for complete search history.

(56) References Cited

U.S. PATENT DOCUMENTS

| | | | |
|---|---|---|---|
| 6,493,170 B1 * | 12/2002 | Kato et al. ................... 360/75 |
| 6,631,047 B2 * | 10/2003 | Ishizuka et al. ........... 360/77.03 |
| 6,707,632 B1 * | 3/2004 | Raphael et al. ................ 360/75 |
| 6,791,774 B1 * | 9/2004 | Albrecht et al. ................ 360/17 |
| 7,224,544 B2 * | 5/2007 | Takano et al. ................. 360/66 |
| 7,280,299 B2 * | 10/2007 | Takano et al. ................. 360/66 |
| 7,532,426 B2 * | 5/2009 | Nakagawa et al. ............ 360/66 |
| 7,554,760 B2 * | 6/2009 | Moriya et al. ............. 360/77.04 |
| 2005/0243461 A1 * | 11/2005 | Kitamura et al. ......... 360/99.08 |
| 2006/0139788 A1 * | 6/2006 | Yang et al. .................... 360/75 |

FOREIGN PATENT DOCUMENTS

| | | |
|---|---|---|
| JP | 2006-031846 | 2/2006 |
| JP | 2006-048751 | 2/2006 |

* cited by examiner

*Primary Examiner*—Fred Tzeng
(74) *Attorney, Agent, or Firm*—Greer, Burns & Crain, Ltd.

(57) ABSTRACT

A servo pattern is positioned in a DC erased portion to which a DC erase process has been performed, and recording tracks and track groove portions (discrete portions) are positioned in an AC erased portion to which an AC erase process has been performed. The track groove portions extend in a circumferential direction. The AC erased portion and the DC erased portion are both made of a magnetic material. In the servo pattern, four lines of preamble portions extending almost in a radial direction are formed and a plurality of pit portions disposed in a dotted manner in two lines are arranged. The pit portions are positioned rearward of the preamble portions in respect of a scanning direction of a magnetic head.

15 Claims, 30 Drawing Sheets

DEMAGNETIZATION FIELD

PERPENDICULAR MAGNETIC RECORDING MEDIUM, MANUFACTURING METHOD THEREOF AND MAGNETIC RECORDING DEVICE

CROSS-REFERENCE TO RELATED APPLICATIONS

This application is based upon and claims the benefit of priority from the prior Japanese Patent Application No. 2006-256343, filed on Sep. 21, 2006, the entire contents of which are incorporated herein by reference.

BACKGROUND OF THE INVENTION

1. Field of the Invention

The present invention relates to a perpendicular magnetic recording medium suitable to increase recording density, a manufacturing method thereof and a magnetic recording device.

2. Description of the Related Art

In a hard disk device being one of recording devices, recording density is on the logarithmic increase. In an aim of increasing recording density, studies on the perpendicular magnetic recording, which magnetizes in the perpendicular direction to the surface of a magnetic recording medium, show progresses, while a longitudinal recording, which magnetizes in the parallel direction with the surface of the magnetic recording medium, has been employed to this date.

As shown in FIG. 22, according to the perpendicular magnetic recording, information is recorded in a manner in which a recording layer of a perpendicular magnetic medium 105 is magnetized in accordance with magnetic field from a main magnetic pole 103 of a magnetic head. The magnetic head is also provided with a return yoke (auxiliary magnetic pole) 102 connected to the main magnetic pole, a coil 101 generating magnetic field, and a reproducing element 104 reading out information from the perpendicular recording medium.

As shown in FIG. 23, in a perpendicular magnetic recording medium, an adhesive layer 112, a soft magnetic underlayer 113, an intermediate layer 114, a granular layer (recording layer) 115, a cap layer 116, a protective layer 117, and a lubricant layer 118 are stacked on a glass substrate 111. In the perpendicular magnetic recording medium of the structure as described above, a recording magnetic field from a magnetic head is refluxed to obtain a favorable recording characteristic. Note that, in the perpendicular magnetic recording, demagnetizing field is generated from the surface of the recording medium. Therefore, a recording/reproducing characteristic varies depending on an initialized state. For example, as shown in FIG. 25, a curve (M-H curve) indicating a change in magnetization M when magnetic field H is applied from the direction perpendicular to the perpendicular magnetic recording medium goes upward almost vertically (broken line) when there is no influence of the demagnetizing field, while the curve slants when there is influence of the demagnetizing field (solid line). When the effect of the demagnetizing field as described above is considered, it is stable in view of energy when the magnetization is reversed little by little as compared with the case where the magnetization is constant, so that the perpendicular magnetic recording can be said to be suitable for high density recording.

In addition, in an aim of increasing recording density, studies on a recording medium called as a discrete track medium show progress as well. As shown in FIG. 26, in a conventional recording medium 121, a plurality of recording tracks 122 are arranged in a closely approaching manner to each other, and recorded portions 129 are formed in the recording tracks 122. However, as shown in FIG. 27, in the structure as described above, sometimes a writing running over the adjacent recording track 122 or a writing blotting out the adjacent track 122 is caused. As a result, information already recorded in the adjacent recording track 122 is sometimes erased.

As measures against the above-described situation, in the discrete track medium, a groove portion 123 is provided between the recording tracks 122 as shown in FIG. 28, or a magnetic portion 124 and a nonmagnetic portion 125 are provided as shown in FIGS. 29 to 31. In the example shown in FIG. 29, on the surface of the magnetic portion 124 being a base portion, a plurality of nonmagnetic portions 125 are formed to form the recording tracks 122 therebetween. In the example shown in FIG. 30, inside the magnetic portion 124 being a base portion, a plurality of nonmagnetic portions 125 are embedded to form the recording tracks 122 therebetween. In the example shown in FIG. 31, on the surface of the nonmagnetic portion 125 being a base portion, a plurality of magnetic portions 124 is formed to make the recording tracks 122 be the recording tracks 122 themselves.

In the discrete track medium shown in FIG. 28, recorded portions 129 are formed as shown in FIG. 32, and in the discrete track medium shown in FIG. 29, recorded portions 129 are formed as shown in FIG. 33. At this time, since the groove portion 123 or the nonmagnetic portion 125 exists between the recording tracks 122, the erase (side erases) of the information in the adjacent recording track 122 can be prevented even if the blotting out or running over of a writing is caused. The same is also applicable to the discrete track shown in FIG. 30 or 31.

As described above, in order to increase the recording density, it is effective to adopt the perpendicular magnetic recording and the discrete track medium.

However, under the present circumstances, these technologies are impossible to be combined. When an initialization process called an AC erase process adopted in the perpendicular magnetic recording is performed to the discrete track medium, an appropriate reproduction becomes difficult. This is a fact that the present inventor has found first.

Related arts are disclosed in Japanese Patent Application Laid-Open No. 2006-31846 and Japanese Patent Application Laid-Open No. 2006-48751.

SUMMARY OF THE INVENTION

An object of the present invention is to provide a perpendicular magnetic recording medium capable of realizing higher recording density, a manufacturing method thereof, and a magnetic recording device.

When an AC erase process prevailing as an initialization process of a perpendicular magnetic recording is performed, alternating current is supplied to a magnetic head 132 as magnetic head driving current as shown in FIG. 34. As a result, the magnetizations of the bits adjacent to each other are reversed in a recording layer 131. Note that, as an initialization process of the in-plane magnetic recording, conventionally, a DC erase process has been performed. When the DC erase process is applied to the perpendicular magnetic recording, direct current is supplied to the magnetic head 132 as magnetic head driving current as shown in FIG. 35. As a result, all bits are directed in the same single direction in the recording layer 131. Although the magnetization direction is assumed to be upward in FIG. 35, all the bits may be directed downward by interchanging plus and minus of the direct current.

Here, the description will be given of the reason that the AC erase process is adopted in the perpendicular magnetic recording. FIG. 36 shows a reproduction signal in the case where a signal of a constant frequency is recorded in a perpendicular magnetic recording medium in which a single piece of DC erased portion to which the DC erase process was performed is arranged between two pieces of AC erased portions to which the AC erase process was performed. When the signal is recorded in the DC erased portion, the influence of demagnetizing field is large, and the offset of the signal is easily caused, as shown in FIG. 36. Therefore, asymmetry of the signal (reproduction signal) detected by the magnetic head increases, and a recording/reproducing characteristic degrades. Meanwhile, in the DC erased portion, since it is placed in the same state as the state where the magnetic field is applied always in the same direction backed by the demagnetizing field, inverse magnetic field possibly arises as time goes on or a part of the magnetization is possibly reversed (thermally relaxed). Meanwhile, no offset is caused in the AC erased portion, in which no inverse domain and thermal relaxation possibly arise. Based on the reason as described above, as an initialization process, the AC erase process is adopted in the perpendicular magnetic recording. However, as previously described, when the AC erase process is performed to the discrete track medium, an appropriate reproduction becomes difficult.

Here, a problem when the AC erase process is performed to the discrete track medium will be described. FIG. 37 is a view showing a servo pattern and recording tracks sandwiching the servo pattern therebetween. In the example, a plurality of discrete portions 61 extending in the circumferential direction are formed in a magnetic portion 64 by sandwiching the recording tracks therebetween. The discrete portion 61 is composed of the same groove portion as the groove portion 123 in FIG. 28. Further, servo patterns are selectively formed and include preamble portions 62 and pit portions 63. When information is recorded and reproduced, trucking is performed to position the magnetic head above a desired recording track, it is required to detect the servo pattern at that time.

However, according to the verification performed by the present inventor, after the AC erase process was performed to the discrete track medium, as shown in FIG. 37, signal output constantly indicates a zero level, and no preamble portion 62 and pit portion 63 can be detected. In other words, the servo pattern cannot be detected, and no trucking is allowed. Also, after the DC erase process was performed, as shown in FIG. 37, it is possible to detect the preamble portions 62 and the pit portions 63, however, asymmetry, thermal relaxation and the like of the reproduction signal is easily caused in the recording track positioning between the discrete portions 61 as described above.

As described above, in the conventional arts, when the perpendicular magnetic recording and the discrete track medium are combined, the appropriate reproduction becomes difficult due to the tracking problem caused. After pursuing the cause as described above and making due diligent efforts to bring a solution to the cause, the present inventor has devised aspects of the invention as will be described below.

A perpendicular magnetic recording medium according to the present invention has a plurality of recording tacks extending in parallel with each other and a servo pattern intervening in each of the recording tracks. An AC erase process has been performed to the recording tracks and a DC erase process has been performed to the servo pattern.

A magnetic recording device according to the present invention has the above-described magnetic recording medium and a magnetic head recording information to the perpendicular magnetic recording medium and reproducing information from the perpendicular magnetic recording medium.

In a manufacturing method of a perpendicular magnetic recording medium according to the present invention, a plurality of recording tracks extending in parallel with each other and a servo pattern intervening in each of the recording tracks are formed, and thereafter, a DC erase process to the recording tracks and the servo pattern are performed. Next, an AC erase process is performed to the recording tracks.

DETAILED DESCRIPTION OF THE PREFERRED EMBODIMENTS

Hereinafter, embodiments according to the present invention will be specifically described with reference to the attached drawings.

First Embodiment

Figure 1:
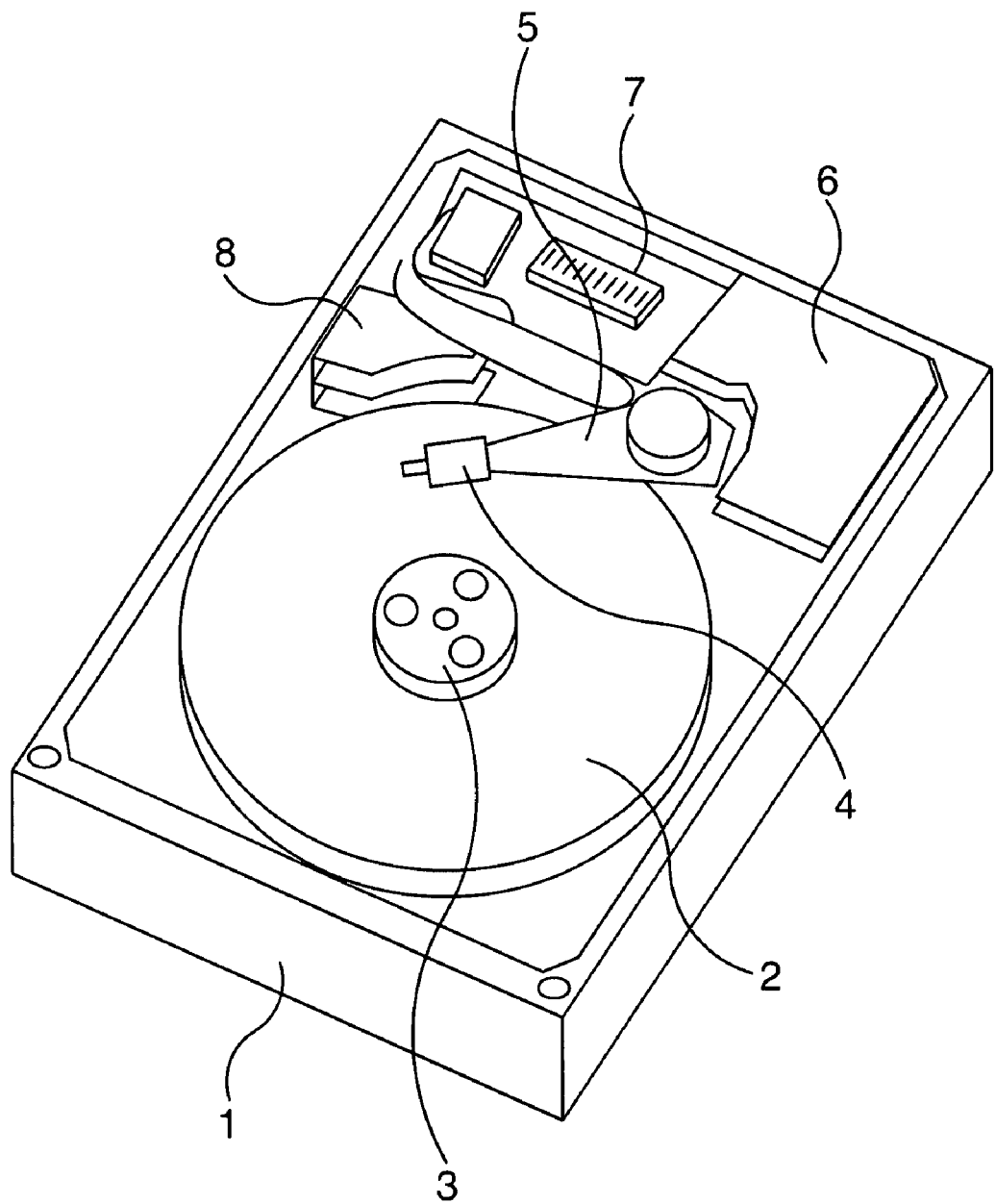
FIG. 1 is a schematic diagram showing a structure of a magnetic recording device (hard disk device) according to a first embodiment of the present invention.

Firstly, a first embodiment of the present invention will be described. FIG. 1 is a schematic diagram showing a structure of a magnetic recording device (hard disk device) according to the first embodiment of the present invention.

Figure 2:
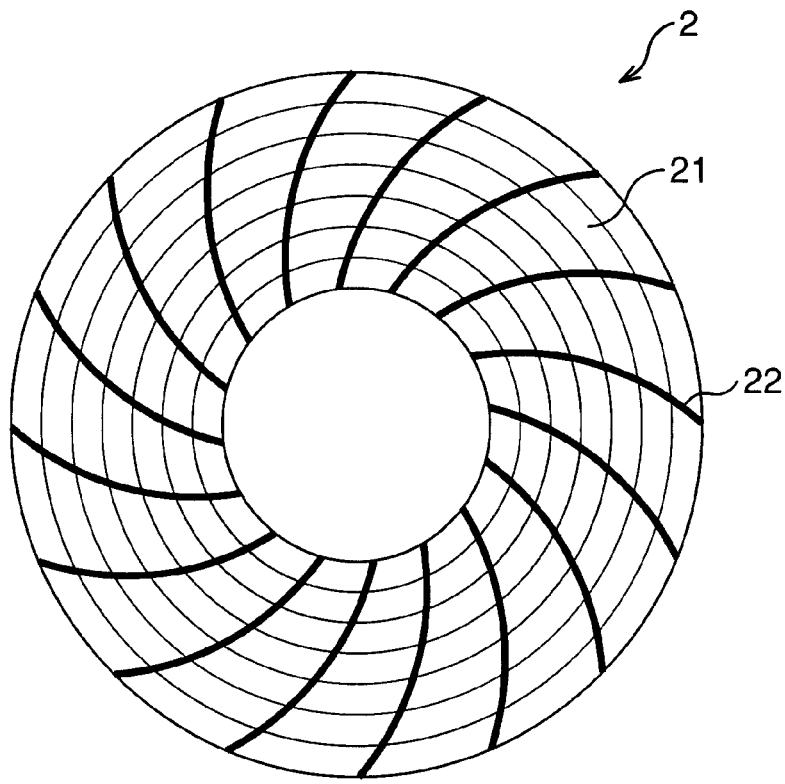
FIG. 2 is a view showing an outline of a magnetic recording medium 2.

In the hard disk device, a magnetic recording medium 2, a spindle motor 3, a magnetic head 4, a suspension 5, a voice coil motor 6, a control circuit 7 and a ramp 8 are arranged on a base 1. The hard disk device records/reproduces information into/from the magnetic recording medium 2 using the magnetic head 4 by turning the magnetic recording medium 2 of a disk shape at a predetermined speed by the spindle motor 3. When the hard disk device is in operation, the magnetic head 4 flies about 10 nm above the surface of the magnetic recording medium 2 and the flying amount is kept by the suspension 5. Further, as shown in FIG. 2, the magnetic recording medium 2 includes a plurality of recording tracks 21 provided circumferentially, and a servo pattern 22 used for the magnetic head 4 to track. In the tracking, the control circuit 7, based on a signal from the servo pattern 22 inputted via the magnetic head 4, adjusts the position of the magnetic head 4 with the voice coil motor 6 driving the magnetic head 4, so as to make the magnetic head 4 positioned above a desired recording track 21. Note that the ramp 8 is a position into which the magnetic head 4 retreats when the magnetic recording medium 2 is halted.

Figure 3:
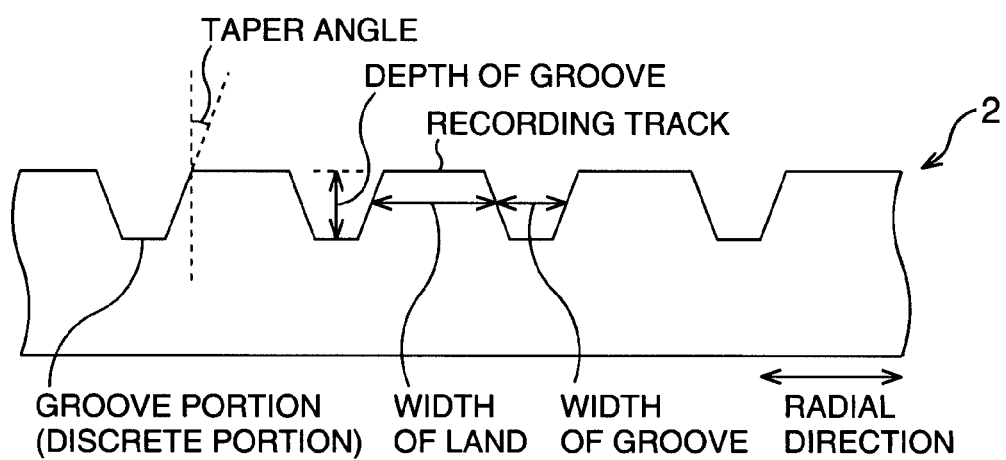
FIG. 3 is a view showing a cross-sectional shape of the magnetic recording medium 2.

Further, as shown in FIG. 3, as a magnetic recording medium 2, a discrete track medium is used. For instance, the depth of a track groove composing a discrete portion is about 10 nm, the width of the track groove is about 40 nm, the taper angle of the track groove is about 60 degrees, and the width of the land (recording track) is about 80 nm.

Figure 4:
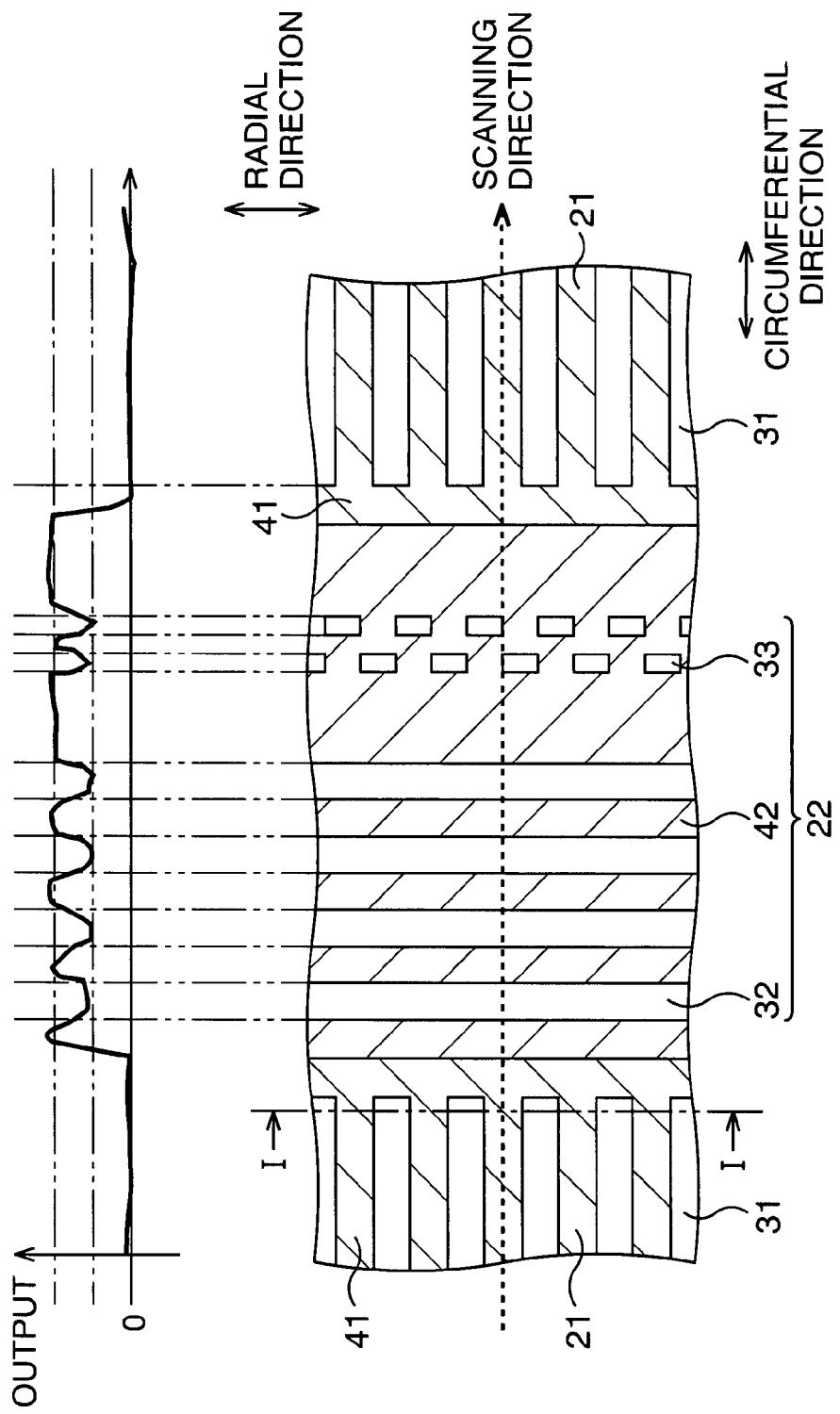
FIG. 4 is a schematic diagram showing in detail a pattern in the first embodiment.

Further, FIG. 4 shows details of the recording tracks 21 and the servo pattern 22 crossing the recording tracks 21. Note that FIG. 3 corresponds to a section cut along the I-I line in FIG. 4. In the present embodiment, the servo pattern 22 is positioned at a DC erased portion 42 to which the DC erase process has been performed, and the recording tracks 21 and track groove portions 31 (discrete portion) are positioned at an AC erased portion 41 to which the AC erase process has been performed. The track groove portions 31 extend in the circumferential direction. The AC erased portion 41 and the DC erased portion 42 are both made of a magnetic material. In the servo pattern 22, four lines of preamble portions 32 extending almost in the radial direction are formed and a plurality of pit portions 33 disposed in a dotted manner in two lines are formed. The pit portions 33 is positioned rearward of the preamble portions 32 in respect of the scanning direction of the magnetic head 4.

Figure 5:
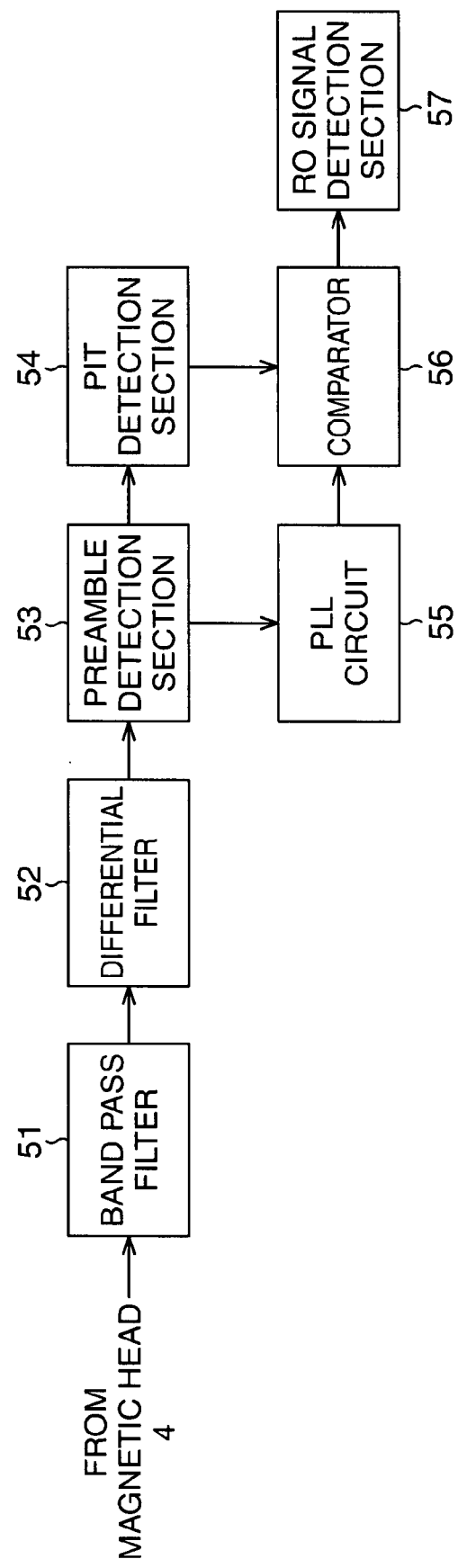
FIG. 5 is a block diagram showing a structure of a control circuit 7.

Further, the control circuit 7 includes a circuit shown in FIG. 5. In other words, a band pass filter 51 into which the signal outputted from the magnetic head 4 is inputted, a differential filter 52, a preamble detection section 53 and a pit detection section 54 are connected in this order. In addition, a PLL circuit 55 generating a clock signal in accordance with the detected result of the preamble portions 32 by the preamble detection section 53, a comparator 56 comparing the detected result of the pit portions 33 by the pit detection section 54 and the clock signal, and an RO signal detection section 57 detecting an RO (RUN OUT) signal for tracking in accordance with the comparison result by the comparator 56 are provided. With the circuit of the above-described structure, the position of the magnetic head 4 moving above the servo pattern 22 is detected, the outputted signal from the RO signal detection section 57 is inputted into the voice coil motor 6, and thus the magnetic head 4 is tracked. In this manner, by the control circuit 7, the magnetic head 4 is servo controlled.

In the hard disk device thus structured, when the recording tracks 21 have no information recorded, no offset is caused in the reproduction signal (outputted signal) from the recording tracks 21, as shown in FIG. 4. This is in that the recording tracks 21 are positioned in the AC erased portion 41, to which the AC erase process has been performed.

On the other hand, in respect of the servo pattern 22, the reproduction signal is outputted in accordance with the positions of the preamble portions 32 and the pit portions 33. This is in that the preamble portions 32 and the pit portions 33 are positioned in the DC erased portion 42, to which the DC erase process has been performed.

Hence, according to the present embodiment, asymmetry and thermal relaxation and the like of the outputted signal can be prevented, while a highly precise tracking making use of the servo pattern 22 is performed. Backed by this, the perpendicular magnetic recording and the discrete track medium can be combined, so that the higher density recording can be realized.

Figure 37:
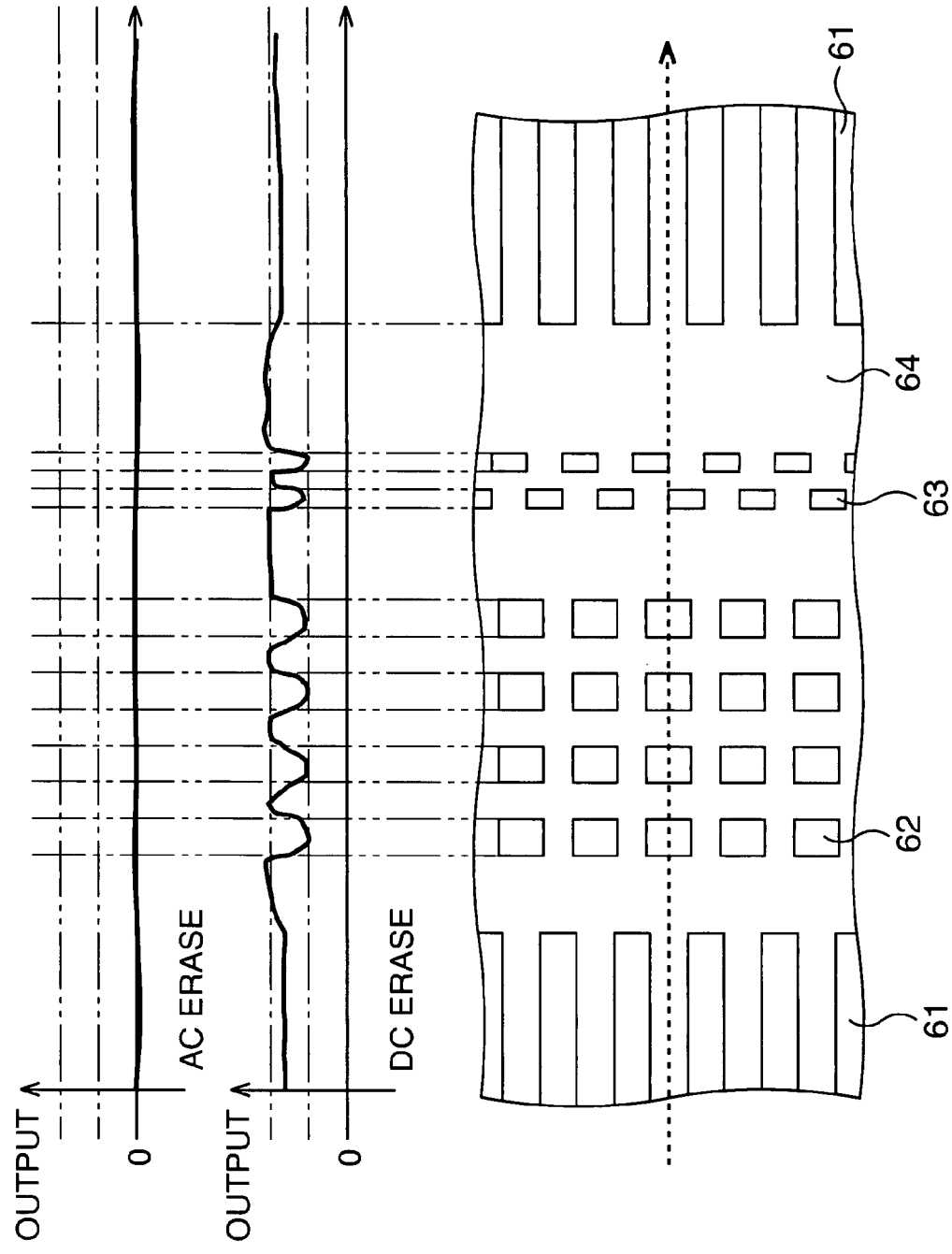
FIG. 37 is a schematic diagram showing in detail a pattern in a magnetic recording medium.

Further, in the present embodiment, as shown in FIG. 4, the preamble portions 32 crosses the recording tracks 21, so that the magnetic head 4 surely moves above the four lines of the preamble portions 32. In the conventional art shown in FIG. 37, the four lines of preamble portions 62 are formed intermittently, in which all or part of he preamble portions 62 may not be sometimes recognized depending on the moving path of the magnetic head, however, in the present embodiment, the problem as described above is prevented.

Figure 6:
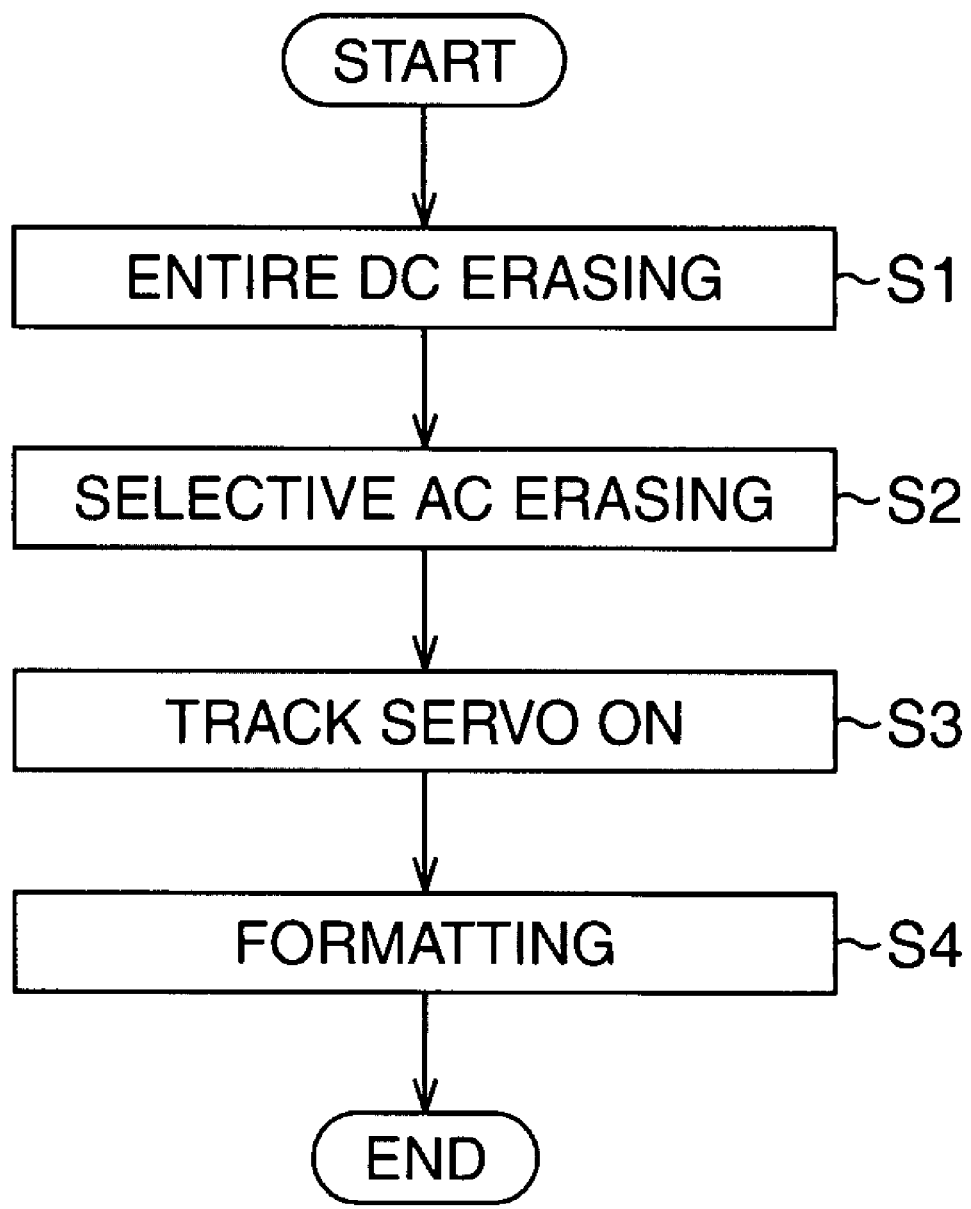
FIG. 6 is a flow chart showing a manufacturing method of the magnetic recording medium 2 in the first embodiment.

Subsequently, a manufacturing method of the magnetic recording medium 2 in the first embodiment will be described. FIG. 6 is a flow chart showing the manufacturing method of the magnetic recording medium 2 in the first embodiment.

Figure 7:
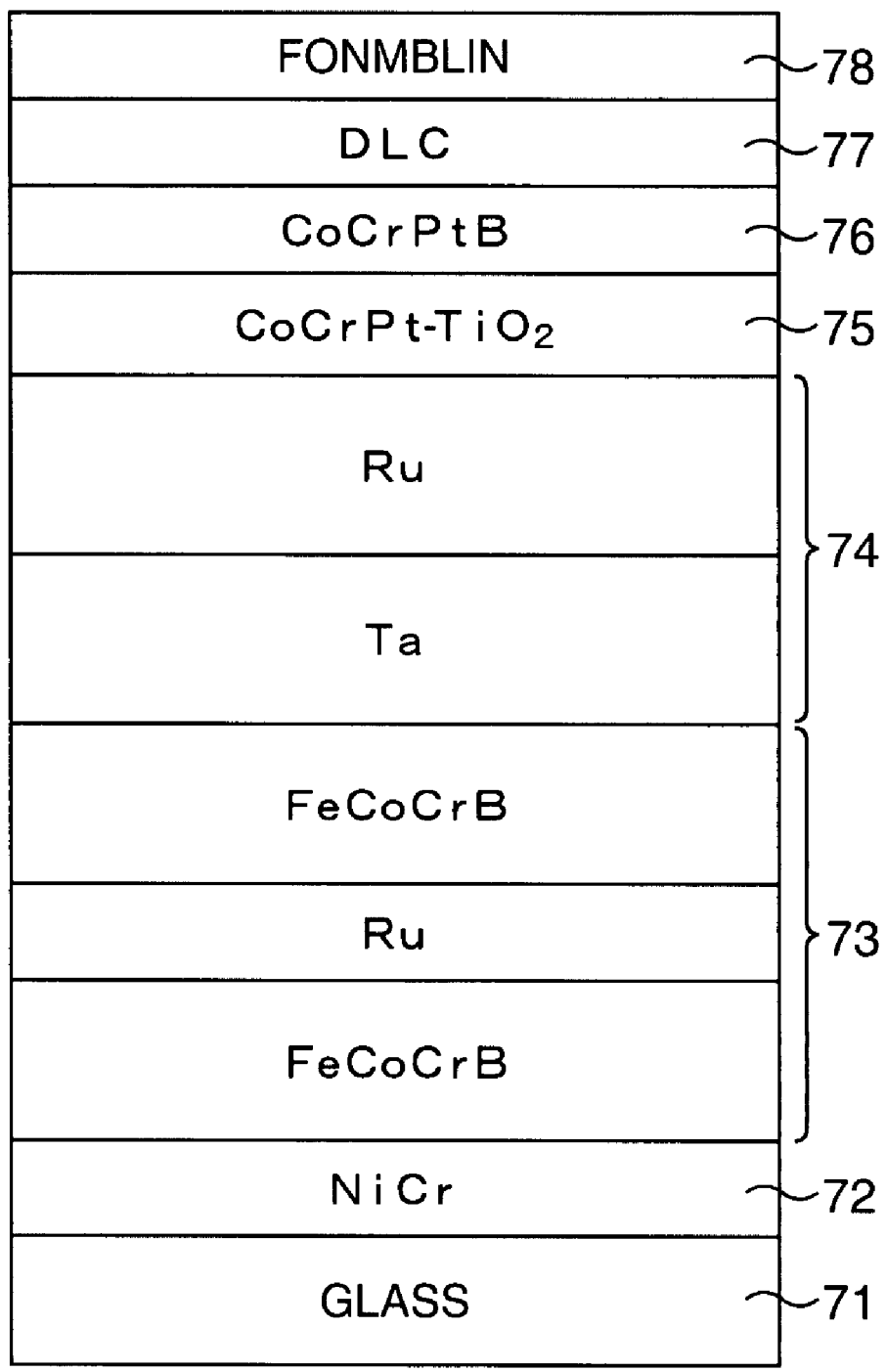
FIG. 7 is a view showing a stacked structure of the magnetic recording medium 2.
Figure 8:
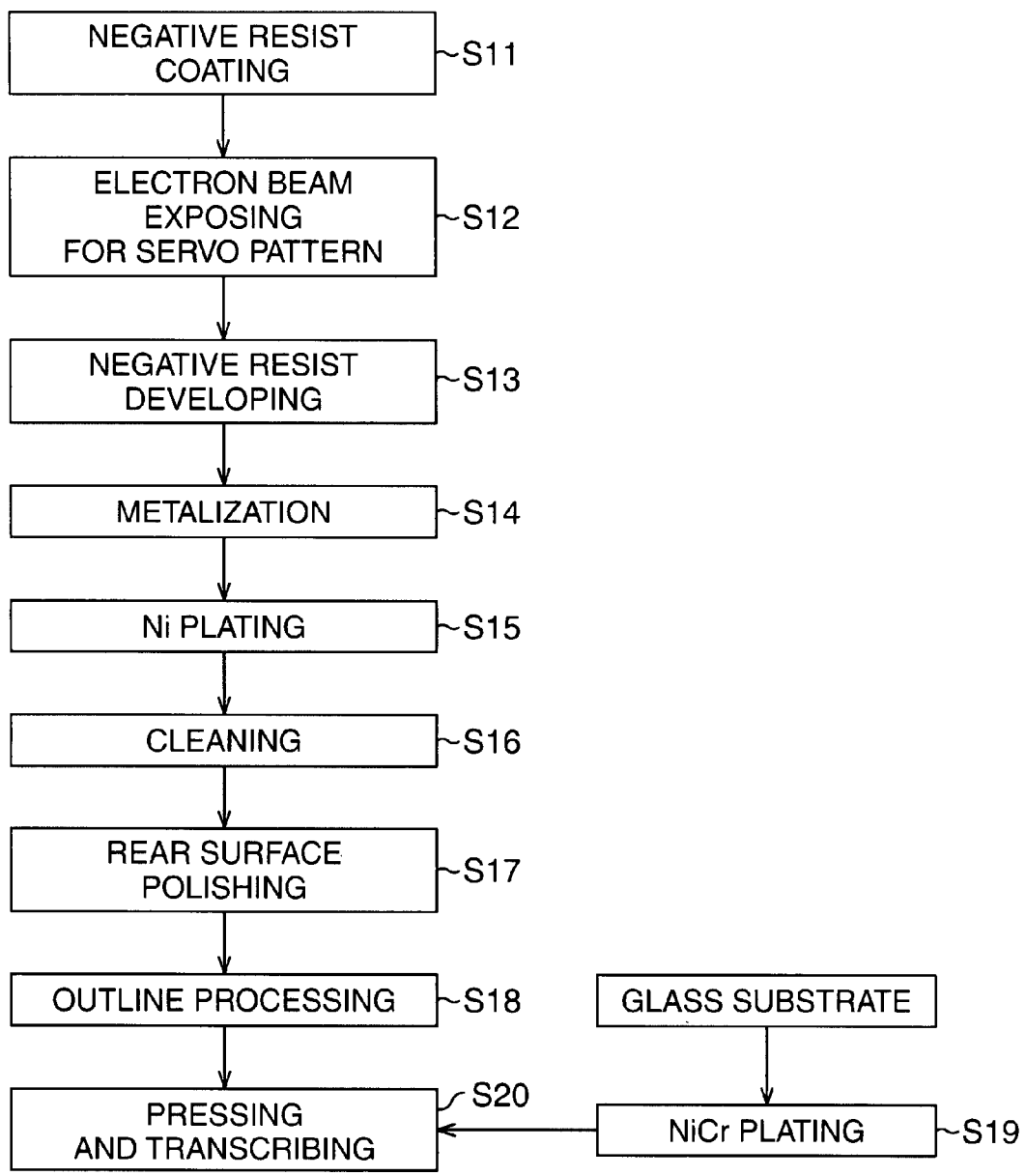
FIG. 8 is a flow chart showing a method of forming a recessed portion.

First, as shown in FIG. 7, a foundation layer 72 is formed on a substrate 71. As a substrate 71, for example, one made of tempered glass is used. Meanwhile, as a foundation layer 72, for example, a NiCr layer is formed by plating. Next, recessed portions are formed in the foundation layer 72 to form the track groove portions 31, the preamble portions 32 and the pit portions 33. In the formation of the recessed portions, a die is pressed and transcribed onto the foundation layer 72. When forming the die, as shown in FIG. 8, first, a negative resist is coated over a substrate (step S11) Next, an electron beam is exposed to the negative resist (step S12). Next, the negative resist is developed (step S13). After that, a metallization process is performed to the substrate (step S14). Further, to the portion to which the metallization process has been performed, a Ni plating process is performed (step S15). Then, the substrate is subject to a cleaning (step S16). Next, the rear face of the substrate is polished (step S17), and an outline of the die is completed (step S18). Step S19 in FIG. 8 corresponds to the above-described formation of the foundation layer 72, and step S20 corresponds to the formation of the recessed portions.

After the recessed portions are formed in the foundation layer 72, as shown in FIG. 7, a soft magnetic underlayer 73, an intermediate layer 74 and a granular layer 75 are sequentially formed by spattering, for example. As a soft magnetic underlayer 73, a multi-layered body composed of, for example, a FeCoCrB layer, a Ru layer and a FeCoCrB layer is formed. As an intermediate layer 74, a multi-layered body composed of, for example, a Ta layer and a Ru layer is formed. As a granular layer 75 (recording layer), for example, a CoCrPt layer having a mass of $TiO_2$ particles dispersed in a grain boundary thereof is formed. Accordingly, in the granular layer 75, the crystal grains made of CoCrPt are surrounded by the $TiO_2$ particles. Further, a cap layer 76 is formed on the granular layer 75. As a cap layer 76 a CoCrPtB layer is formed by sputtering, for example. Next, a protective layer 77 is formed on the cap layer 76. As a protective layer 77, a diamond like carbon (DLC) layer is formed by a low-temperature CVD, for example. Next, a lubricant layer 78 is formed on the protective layer 77. As a lubricant layer 78, a layer of Fonmblin (fluorocarbon resin) being a lubricant is formed by a pulling-up method, for example. In the above-described manner, an initial disk (a blank disk) being an original model of the magnetic recording medium 2 is formed. Note that, on the surface of the initial disk and the magnetic recording medium 2, there are recessed portions reflecting the recessed portion formed in the foundation layer 72.

After that, in step S1 in FIG. 6, the DC erase process is performed to the entire initial disk (blank disk), as a first initialization process. In this DC erase process, a permanent magnet of, for example, NdFeCo is disposed so that the magnetic field passes through the blank disk in the perpendicular direction, and the magnetic field is applied to the entire blank disk by turning the blank disk. As a result thereof, the magnetizations in the granular layer 75 are all directed to the same perpendicular direction with respect to the surface of the blank disk.

Figure 9:
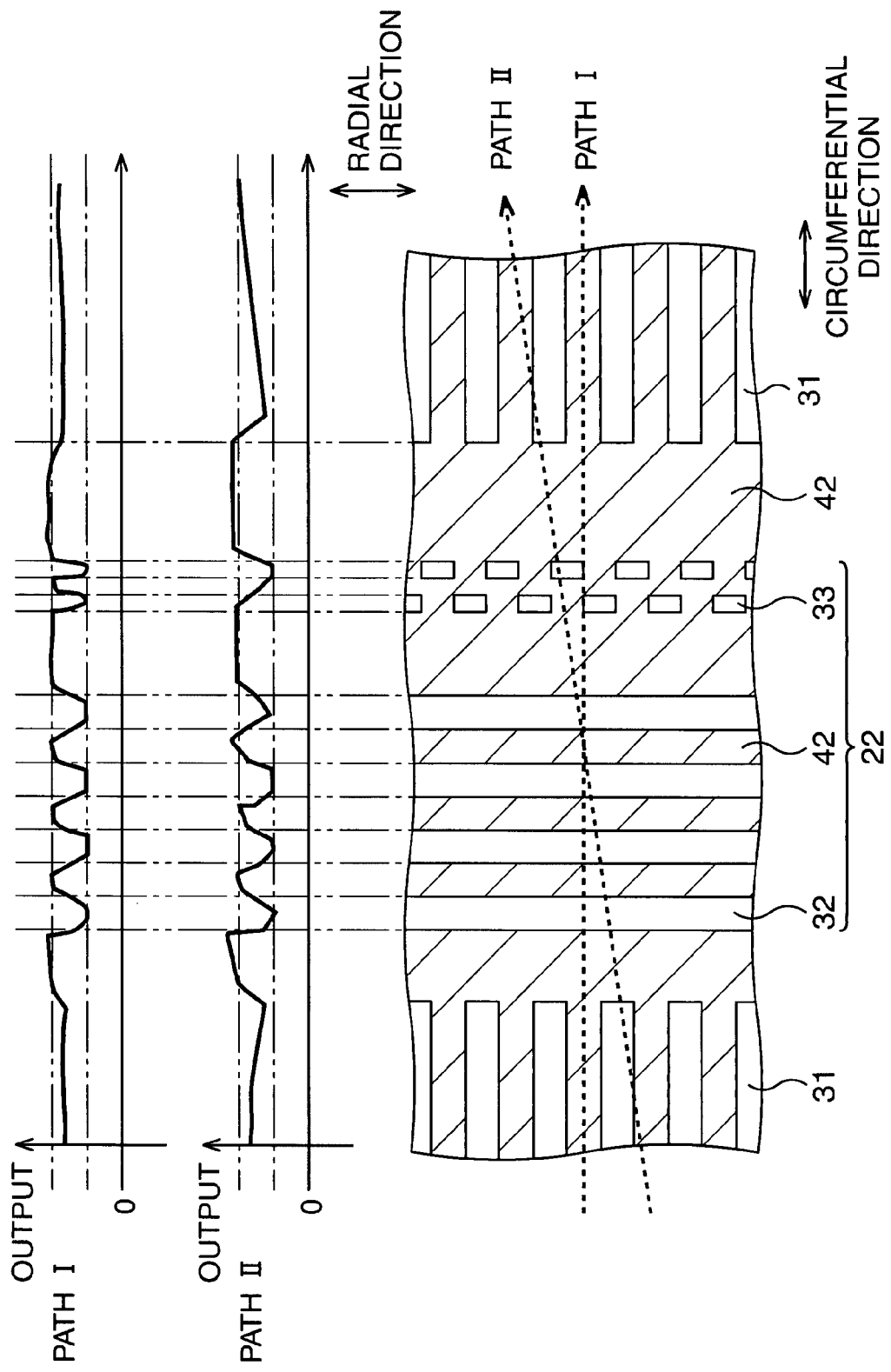
FIG. 9 is a schematic diagram showing a state of an initial disk after DC erase process.

FIG. 9 is a schematic diagram showing the state of the initial disk after the DC erase process. As shown in FIG. 9, after the DC erase process, substantially the entire surface of the initial disk is the DC erased portion 42. Further, in the initial disk, as described above, the track groove portions 31, the preamble portions 32 and the pit portions 33 are already formed, and portions between the track groove portions 31 serve as recording tracks. Because air enters into the track groove portion 31, the magnetic characteristic can be said to be discontinuous between inside of the track groove portion 31 and the recording track. Further, two pieces of recording tracks adjacent each other by sandwiching the track groove portion 31 therebetween can be said to be magnetically separated by the track groove portion 31. Note that the servo pattern 22 is composed of the preamble portions 32 and the pit portions 33.

In this state, when the reproduction head scans above a path I, a signal output reflecting the every recessed portions of the preamble portions 32 and the pit portions 33 is obtained, and the control circuit 7 recognizes that the reproduction head moves above the recording track correctly. Meanwhile, when the reproduction head scans above a path II, a signal output lowers when the head moves above the track groove portion 31, and the signal output reflects only one of the pit portions 33. Accordingly, the control circuit 7 recognizes that the reproduction head is moving inward. Based on the above-described information, the tracking control is performed. The reason why the preamble portions 32 and the pit portions 33 are detected surely in that manner is that the DC erase process has been performed and the signal output lowers in these recessed portions. However, since only the DC erase process has been performed, offset is caused in any case as shown in FIG. 9.

Figure 10:
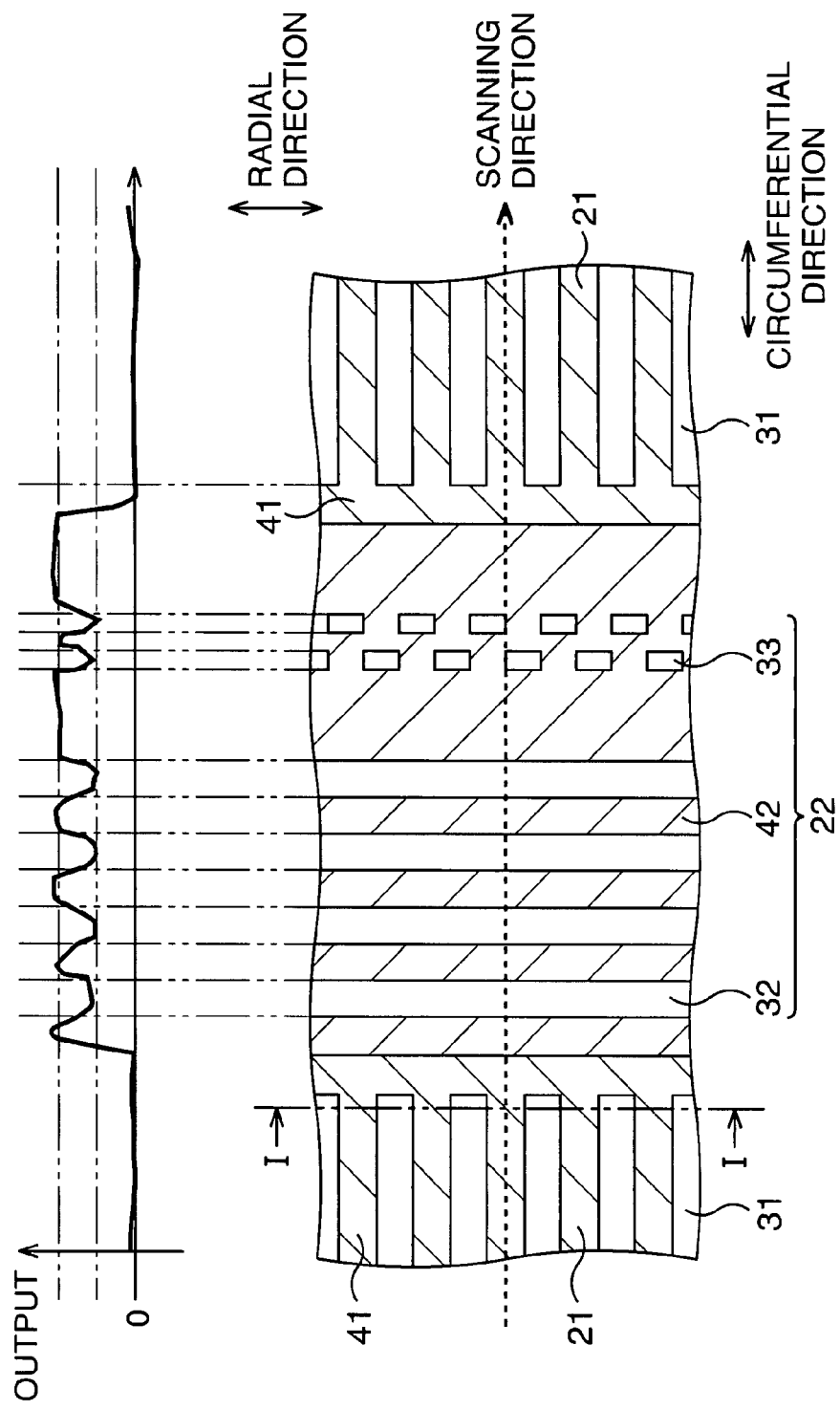
FIG. 10 is a schematic diagram showing a state of the initial disk after AC erase process.

Next, in step S2, as a second initialization process, the AC erase process is performed selectively to the initial disk as shown in FIG. 10. In other words, the AC erase process is performed to the portion composing the recording tracks 21 while leaving the circumference of the servo pattern 22 to be the DC erased portion 42 to form the AC erased portions 41. In the AC erase process, for example, a magnetic head combining a trailing shield write head and a reproduction head having a TMR (Tunnel Magneto-Resistive) element using an aluminum oxide layer as a magnetoresistive effect film is used. Further, for example, a heater to control DFH (Dynamic Flying Height) is provided at the magnetic head, and the flying amount is adjusted by flowing current into the heater. The AC erase process is performed at a recording density of 70.9 Mbpm (=1800 kBPI) by shifting the tracking position. With the AC erase process performed as described above, the offset in the recording track 21 disappears as shown in FIG. 10.

Figure 11:
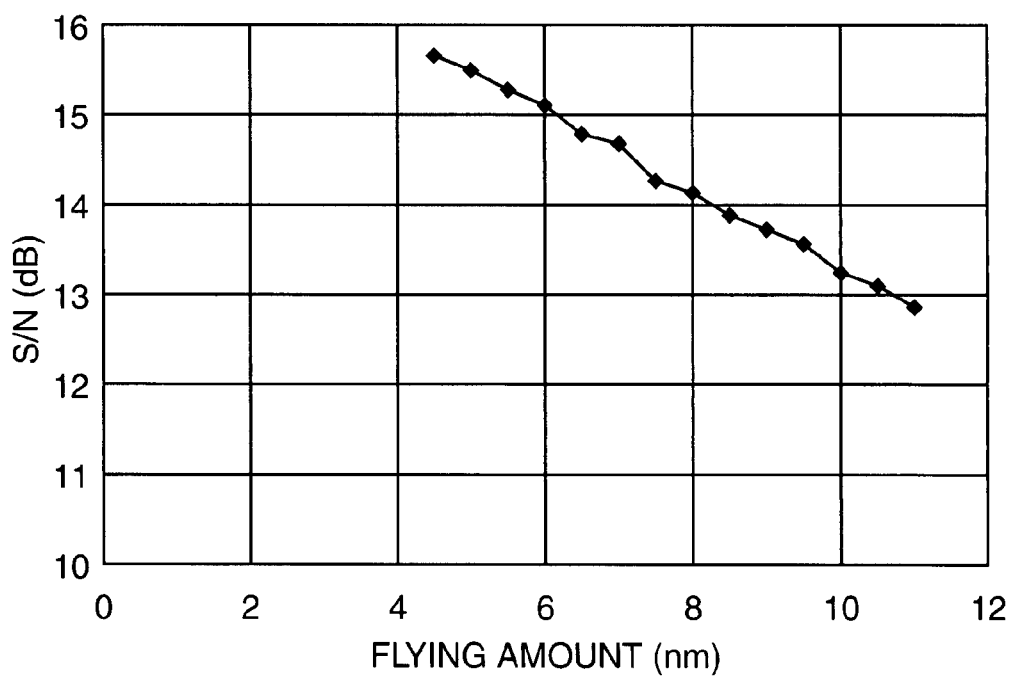
FIG. 11 is a graph showing a relation between a flying amount of a magnetic head and an S/N ratio.

Note that when an S/N ratio was evaluated in a perpendicular magnetic recording medium having no physical protrusion/recession formed for a discrete track using the same magnetic head as described above by recording a signal of 500 kFCI while changing the flying amount under the DFH control, the result as shown in FIG. 11 was obtained. In short, when the flying amount changed by 1 nm, the S/N ratio showed a change of approximately 0.4 dB. Based on this, in the present embodiment, the signal output is deemed to down to approximately 60%. This is because the depth of the track groove portion 31 is about 10 nm in the present embodiment.

After the AC erase process has been performed, a track servo based on the signal from the pit portions 33 is started in step S3, and the initial disk (the magnetic recording medium 2) is formatted in step S4.

By performing the series of processes as described above, the magnetic recording medium 2 in the first embodiment can be manufactured.

Second Embodiment

Figure 12:
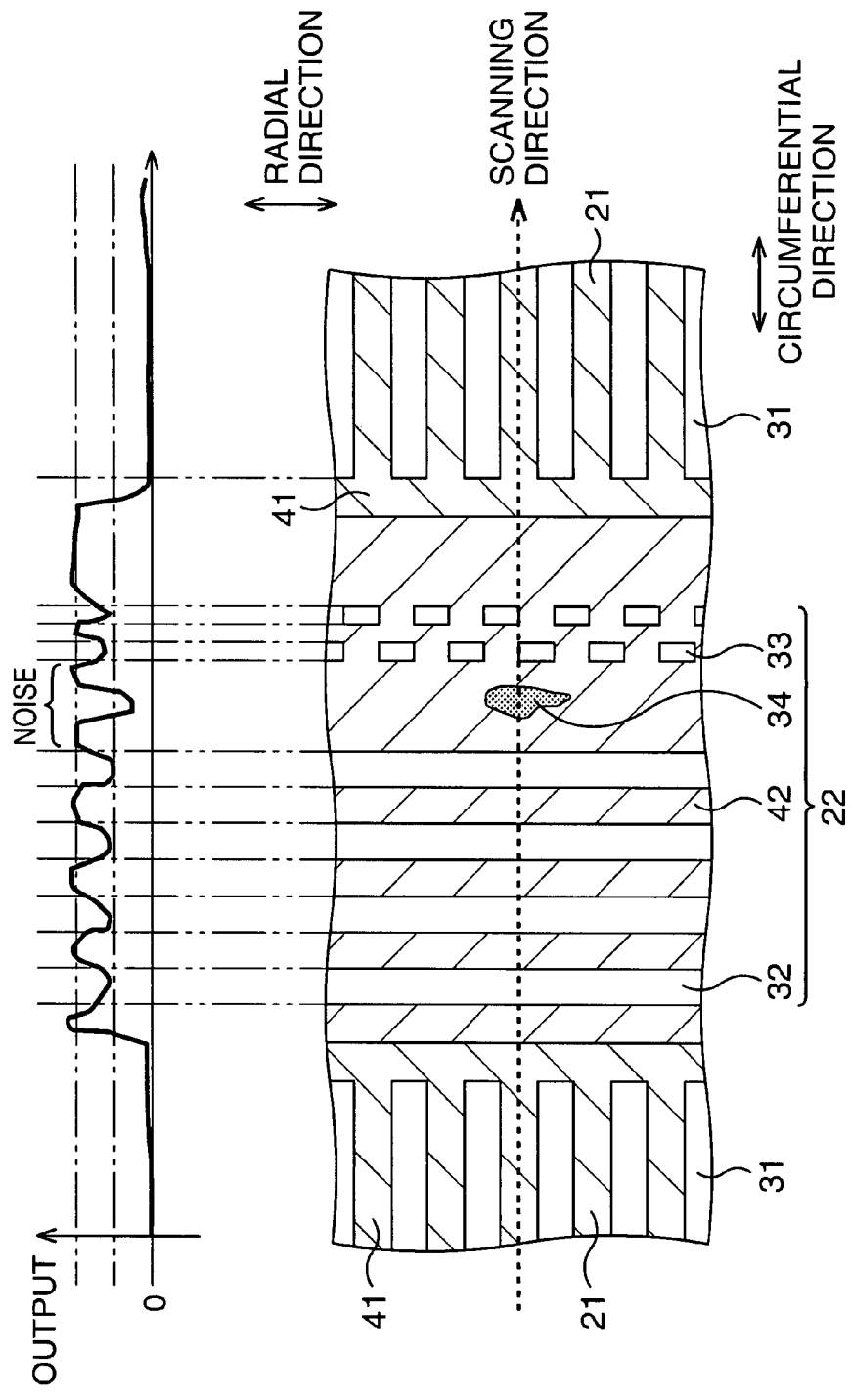
FIG. 12 is a schematic diagram showing a problem accompanied by a micro defect.

Subsequently, a second embodiment of the present invention will be described. In the first embodiment, with the use of the servo pattern 22 including the preamble portions 32 and the pit portions 33, the tracking to the desired track is realized. However, as shown in FIG. 12, when a micro defect 34 or the like exists in the vicinity of the preamble portions 32 and/or the pit portions 33, correct signal detection is impossible, and correct tracking becomes difficult. The reason thereof is as described below. Specifically, the signal recorded in the recording track 21 as user information and the like is detected as a peak to peak value in the positive and negative direction in accordance with the magnetization direction, while the signal of the servo pattern 22 is detected as a zero to peak value. Therefore, the detected signal from the servo pattern 22 is a half of the detected signal from the recording track 21 even when modulation amplitude thereof is at maximum. In other words, the gain of the tracking is a half or therebelow, therefore the existence of the micro defect 34 or the like makes the correct detection be difficult. In the second embodiment, a solution to the problem as described above is obtained.

Figure 13:
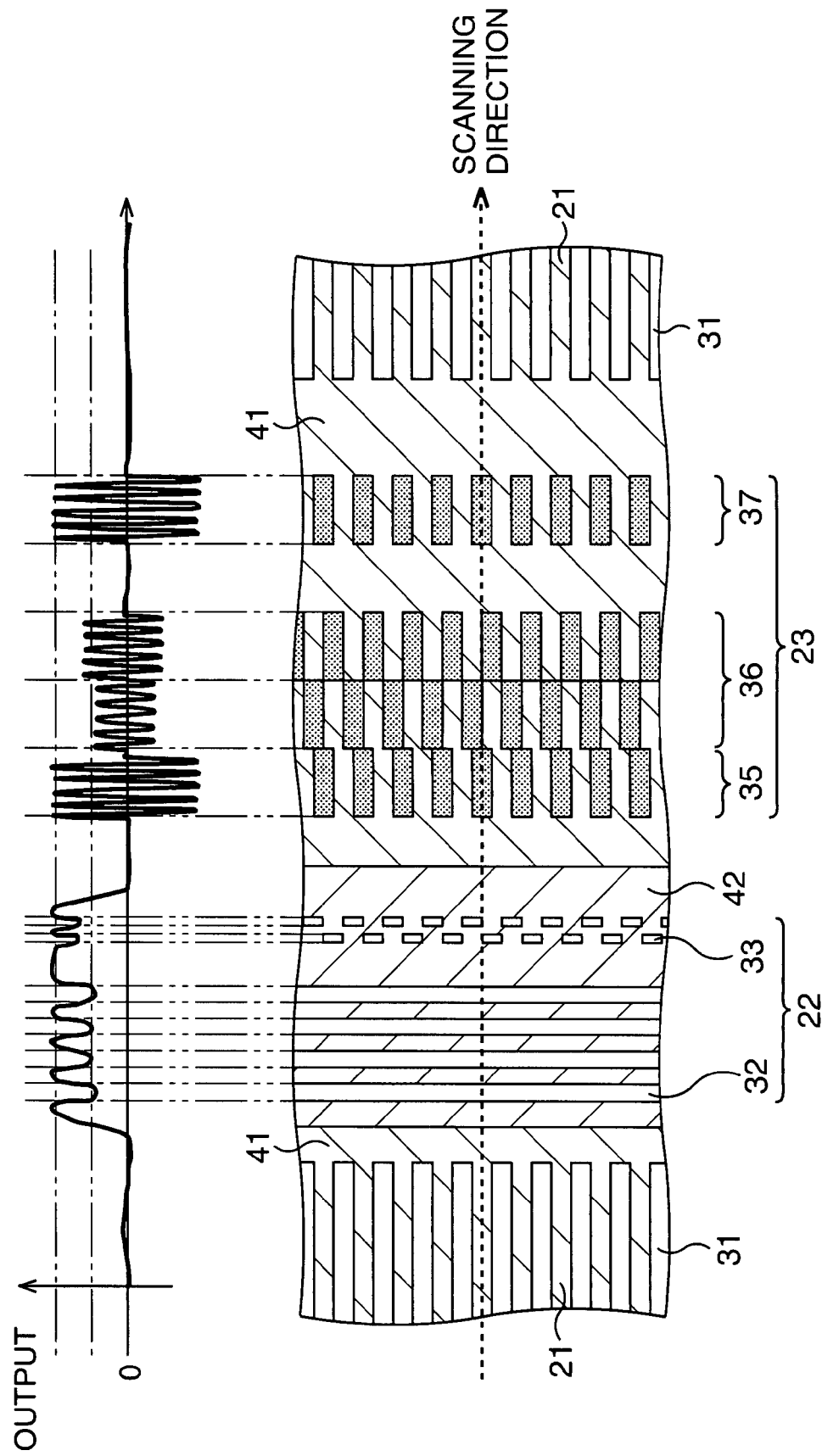
FIG. 13 is a schematic diagram showing in detail a pattern in a second embodiment of the present invention.

In the second embodiment, as shown in FIG. 13, in respect of the scanning direction of the magnetic head 4, a servo pattern 23 is positioned between the servo pattern 22 and the recording track 21 positioned just rearward of the servo pattern 22. The servo pattern 23 includes SYNC portions (synchronization portions) 35, burst portions 36 and address portions 37. Note that, differently from the servo pattern 22, the SYNC portions 35, the burst portions 36 and the address portions 37 are all formed in the plane AC erased portion 41 by recording the servo control signal therein. Specifically, the SYNC portions 35, the burst portions 36 and the address portions 37, and the area (AC erased portion 41) surrounding these are composed of the same material and have the same cross-sectional shape, so that the magnetic characteristic can be said continuous between them.

According to the second embodiment as described above, even if the micro defect 34 or the like exists in the vicinity of the preamble portions 32 and/or the pit portions 33, the correct tracking based on the servo pattern 23 can be performed. The signal recorded in the servo pattern 23 is detected as the peak to peak value, so that the detection based on higher gain is realized. Hence, according to the second embodiment, the tracking can be performed with higher precision than the first embodiment.

Figure 14:
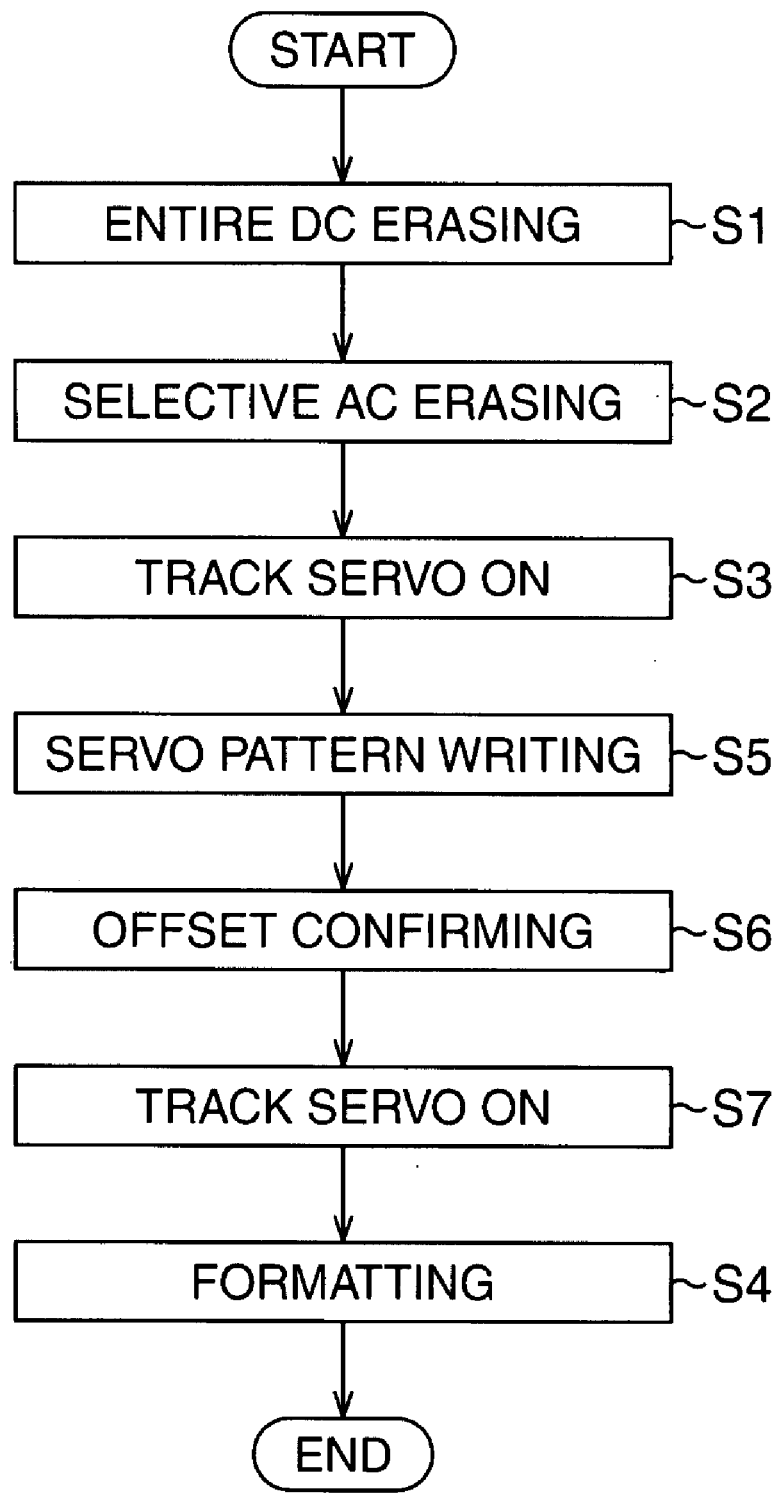
FIG. 14 is a flow chart showing a manufacturing method of the magnetic recording medium 2 in the second embodiment.

Subsequently, a method of manufacturing the magnetic recording medium 2 in the second embodiment will be described. FIG. 14 is a flow chart showing the manufacturing method of the magnetic recording medium 2 in the second embodiment.

First, as in the first embodiment, the processes up to the formation of the AC erased portion 41 (step S1 and S2) are performed. However, in respect of the scanning direction of the magnetic head 4, the distance between the servo pattern 22 and the track groove portion 31 positioned just rearward of the servo pattern 22 is increased to form the AC erased portion 41 as well there.

Next, in step S3, the track servo based on the signal from the pit portions 33 is started, and, in step S5, the servo control signals are selectively recorded in the AC erased portion 41 to form the SYNC portions 35, the burst portions 36 and the address portions 37.

Next, in step S6, offsets when the tracking control is performed using the servo pattern 22 and when the tracking control is performed using the servo pattern 23 are confirmed. If the offset exists, correction in accordance with the amount thereof is performed to the servo pattern 23. Note that the correction in accordance with the offset amount may be performed to the detected signal at an actual operation.

After that, in step S7, a track servo based on the signal from the servo pattern 23 is started, and, in step S4, the initial disk (the magnetic recording medium 2) is formatted.

By performing the series of processes as described above, the magnetic recording medium 2 in the second embodiment can be manufactured.

Third Embodiment

Figure 15:
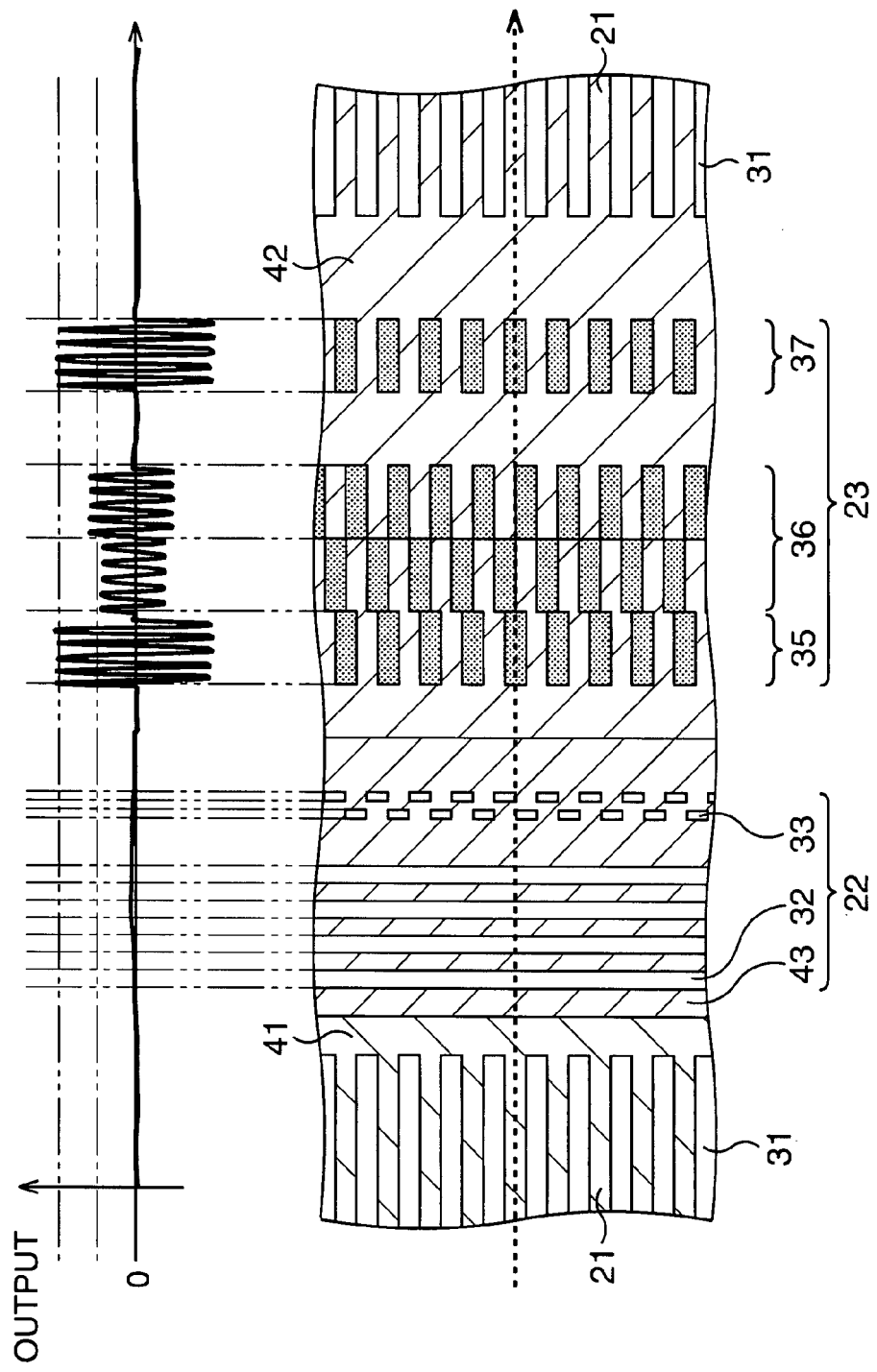
FIG. 15 is a schematic diagram showing in detail a pattern in a third embodiment of the present invention.

Subsequently, a third embodiment of the present invention will be described. FIG. 15 is a schematic diagram showing the magnetic recording medium 2 in the third embodiment of the present invention.

In the second embodiment, the servo pattern 22 is provided in the DC erased portion 42, however, in the third embodiment, by performing the AC erase process also to the DC erased portion 42, the circumference of the servo pattern 23 is made to be an AC erased portion 43.

Figure 16:
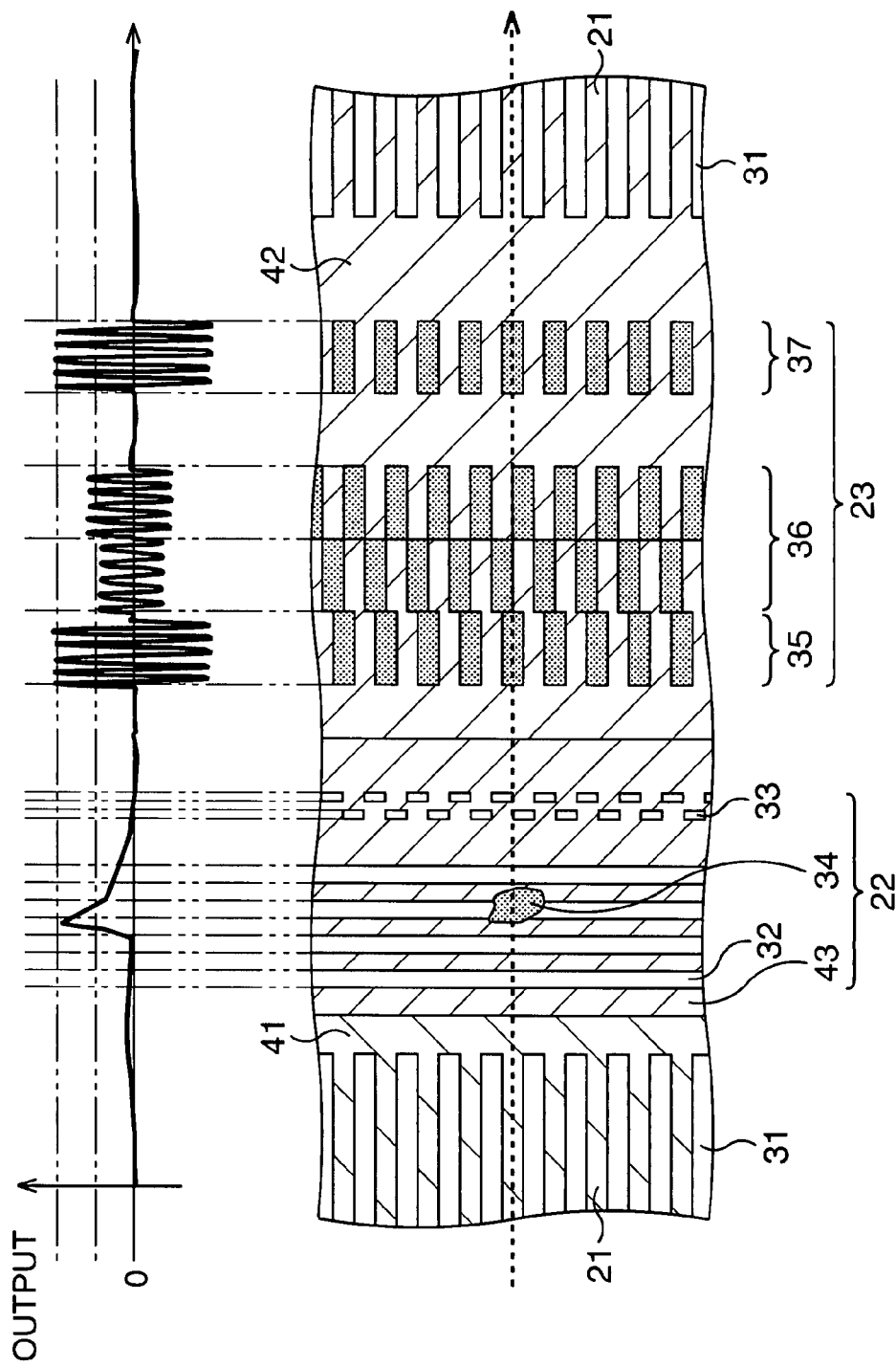
FIG. 16 is a schematic diagram showing an effect of the third embodiment.

According to the third embodiment as described above, since the signal is not detected from the servo pattern 22 as shown in FIG. 15, the tracking control at the time of the actual operation is inevitably performed based on the servo pattern 23. Therefore, as shown in FIG. 16, even if the servo pattern 22 has the micro defect 34 such as a foreign matter attached or the like, the correct control excluding thermal asperity arising together with the micro defect 34 can be performed. In other words, when the foreign matter exists, the foreign matter and the magnetic head 4 sometimes crash to cause a temperature increase, and the output may vary (thermal asperity). However, according to the third embodiment, there is no possibility of detecting the variation of output as the servo control signal by mistake. Accordingly, the tracking control with higher precision is realized.

Fourth Embodiment

Figure 17:
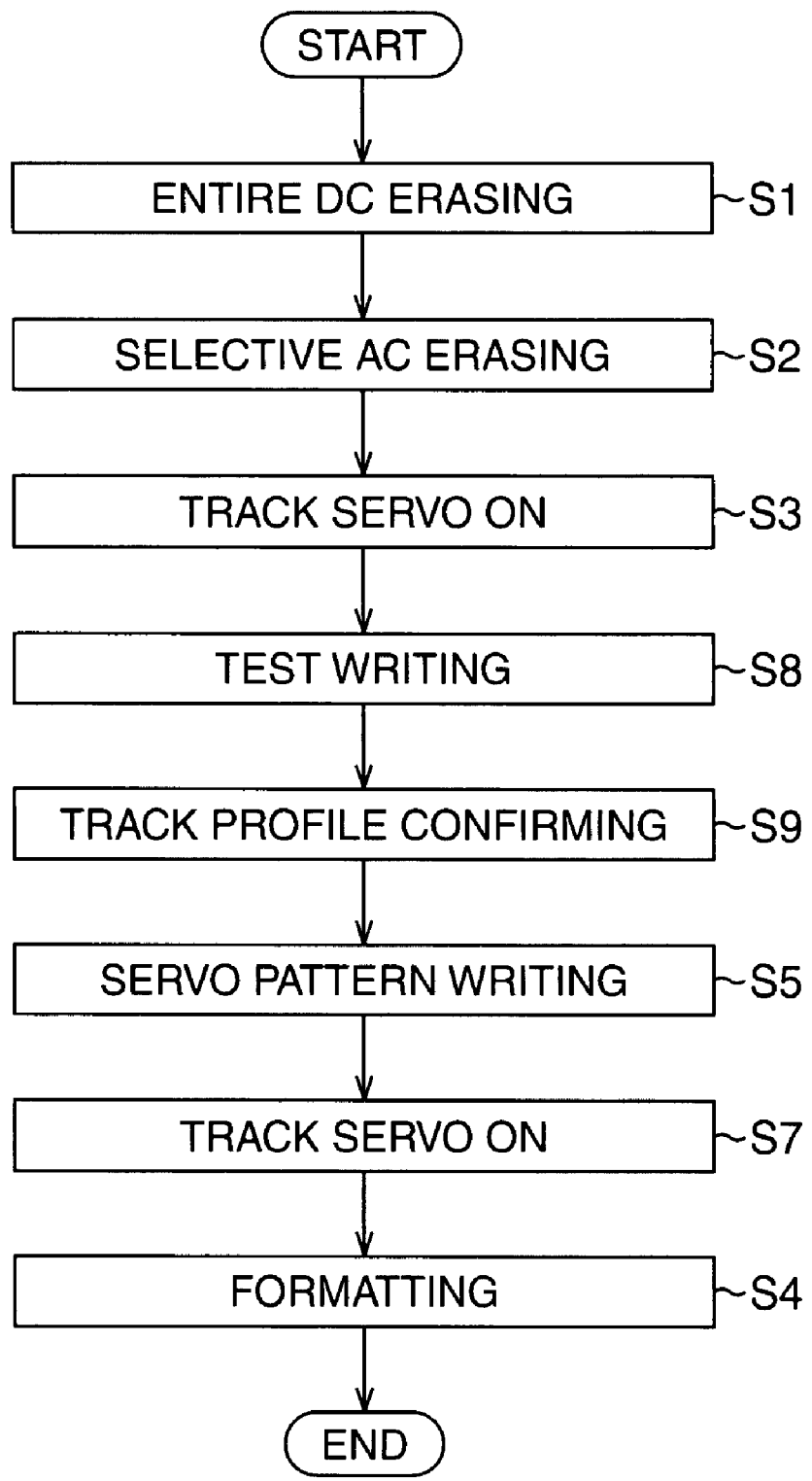
FIG. 17 is a flow chart showing a manufacturing method of a magnetic recording medium 2 in a fourth embodiment.

Subsequently, a fourth embodiment of the present invention will be described. In the fourth embodiment, the manufacturing method of the magnetic recording medium 2 is different from the second embodiment. FIG. 17 is a flow chart showing a manufacturing method of the magnetic recording medium 2 in the fourth embodiment.

In the fourth embodiment, test writing (step S8) and track profile confirming (step S9) are performed between the track servo start in step S3 and the formation of the SYNC portions 35, the burst portions 36 and the address portions 37 in step S5.

In the test writing in step S8, a predetermined signal is recorded in the recording track 21 by gradually shifting the tracking position while the track servo in step S3 is continuously performed.

Figure 18:
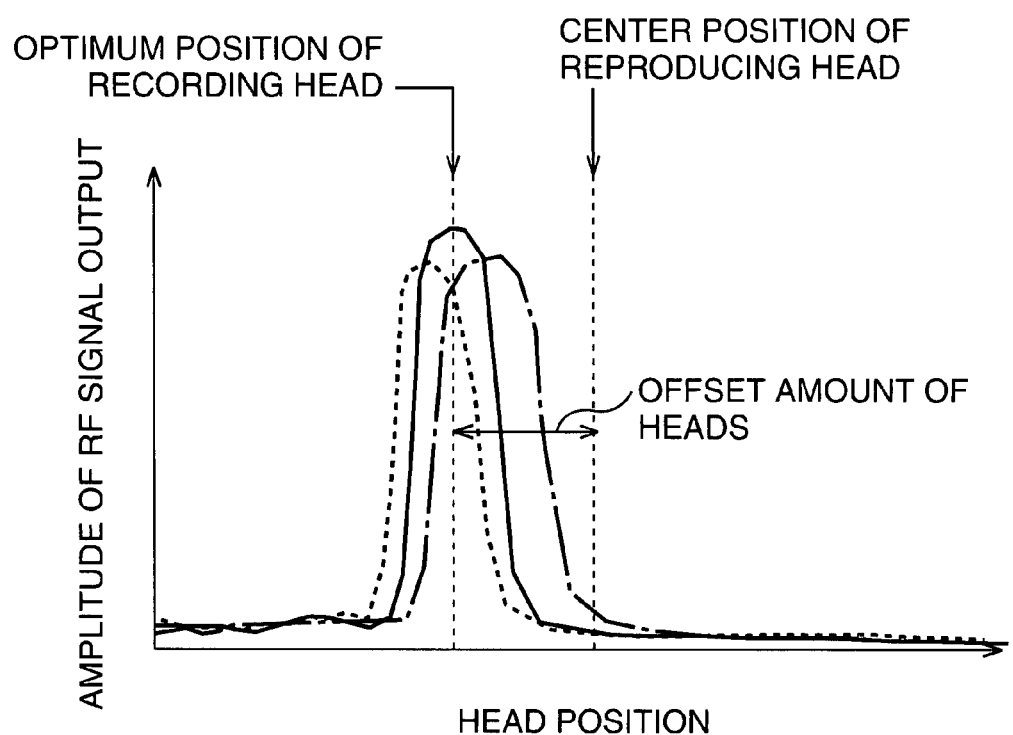
FIG. 18 is a graph showing an example profile of RF signal output amplitude.
Figure 19:
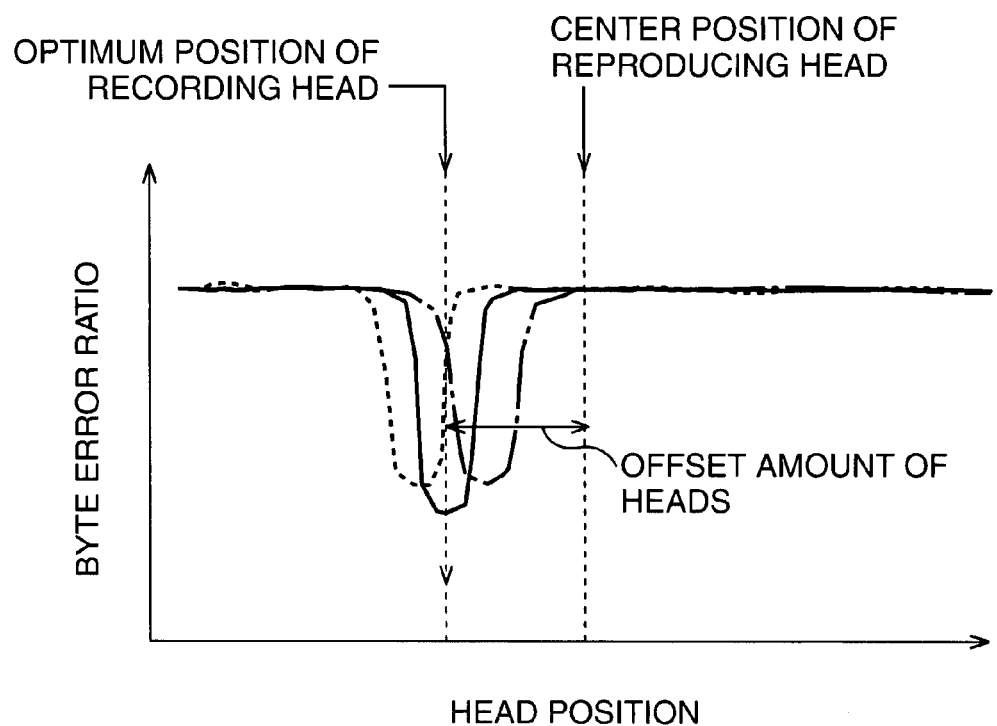
FIG. 19 is a graph showing an example profile of a byte error ratio.
Figure 20:
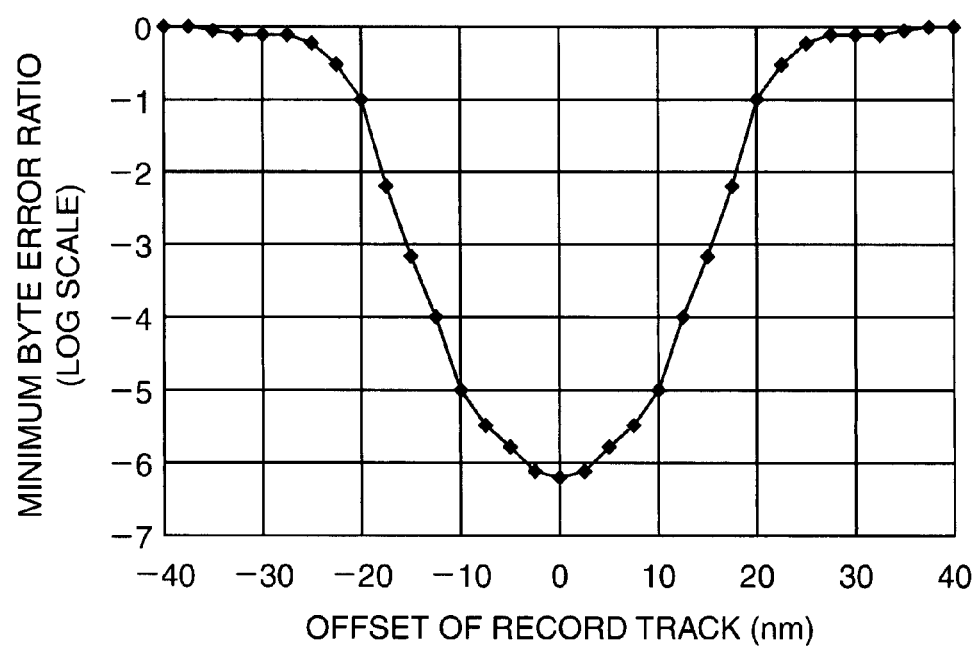
FIG. 20 is a graph showing positions in which the byte error ratio comes to the minimum when an optimum offset amount is 0 (zero) nm.

In step S9, the recorded signal is reproduced to confirm the track profile. If the signal amplitude (RF signal output amplitude) is verified as a track profile, a profile as shown in FIG. 18 is obtained as an example. Further, a byte error ratio of the signal is verified as a track profile, a profile as shown in FIG. 19 is obtained as an example. In FIGS. 18 and 19, the verification results verified at arbitrarily-selected three points are shown. If the verification of the amplitude is performed, the maximum values are compared, and the position having the largest maximum value as shown in FIG. 18 is determined as the optimum position for the recording head, and the difference from the position of the reproduction head at that time is determined as the optimum offset amount. Meanwhile, if the verification of the byte error ratio is performed, the minimum values are compared, and the position having the smallest minimum value as shown in FIG. 19 is determined as the optimum position for the recording head, and the difference from the position of the reproduction head at that time is determined as the optimum offset amount. As one example, a result where the positions having the minimum byte error ratios when the optimum offset amount is 0 (zero) nm are plotted is shown in FIG. 20.

After the optimum position and the optimum offset amount of the recording head are obtained, the processes of forming the servo pattern 23 and thereafter are performed in the same manner as in the second embodiment.

According to the fourth embodiment as described above, the formation of the servo pattern 23 at the desired position is ensured. In the second embodiment, for example, the center positions of the pit portions 33 possibly have a difference. Further, as described above, the amplitude of the signal from the servo pattern 22 is relatively small, so that sufficient precision may not be obtained in the second embodiment. In such cases, the position of the recording head cannot be determined appropriately and the servo pattern 23 is sometimes not formed at the desired position. Contrary to that, according to the fourth embodiment, the servo pattern 23 is formed after the position of the recording head is adjusted, so that the servo pattern 23 with higher precision can be obtained. The tracking control is therefore performed using this servo pattern 23, so that the reproduction with higher precision is realized. Specifically, the recording/reproducing characteristic of information can be improved further.

Figure 21:
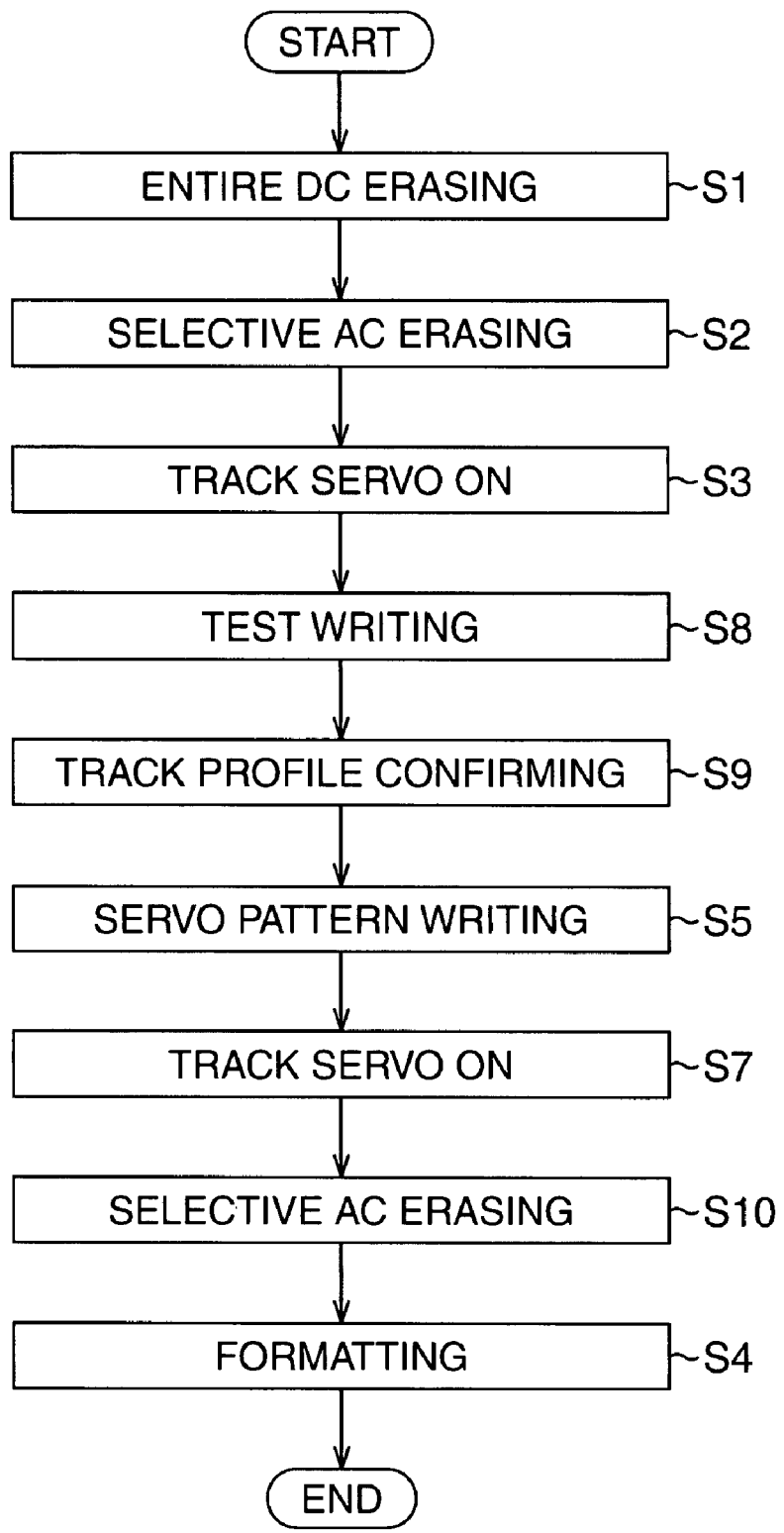
FIG. 21 is a flow chart showing a manufacturing method of the magnetic recording medium 2 when the third embodiment is applied to the fourth embodiment.
Figure 22:
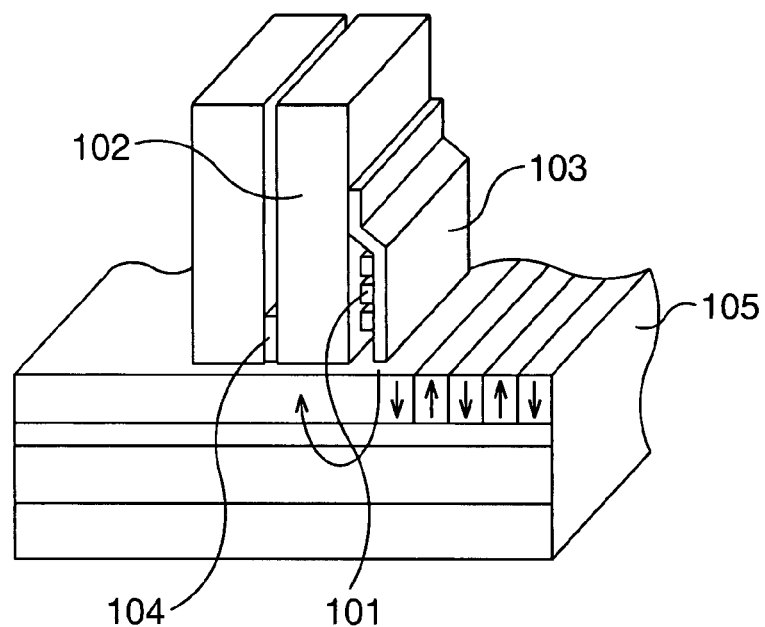
FIG. 22 is a schematic diagram showing a magnetic head and a magnetic recording medium in a perpendicular magnetic recording.
Figure 23:
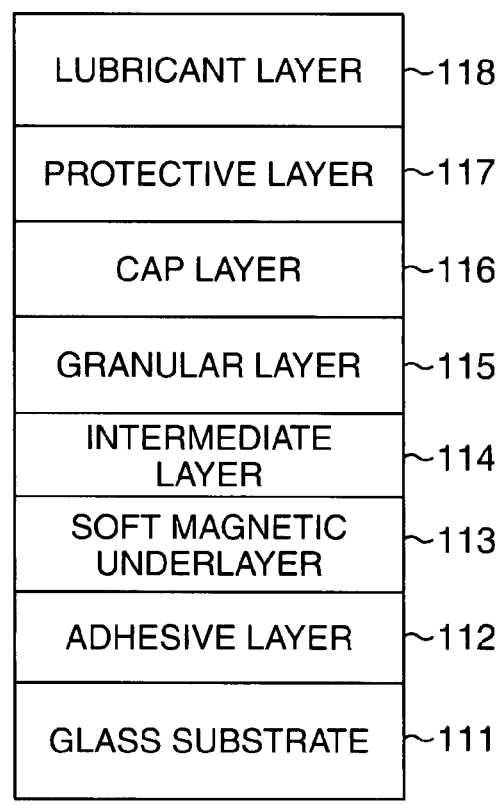
FIG. 23 is a view showing a stacked structure of a conventional magnetic recording medium.
Figure 24:
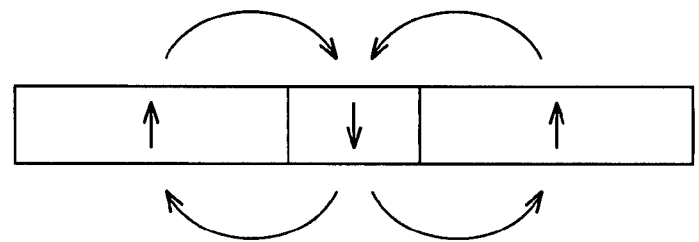
FIG. 24 is a view showing a demagnetizing field.
Figure 25:
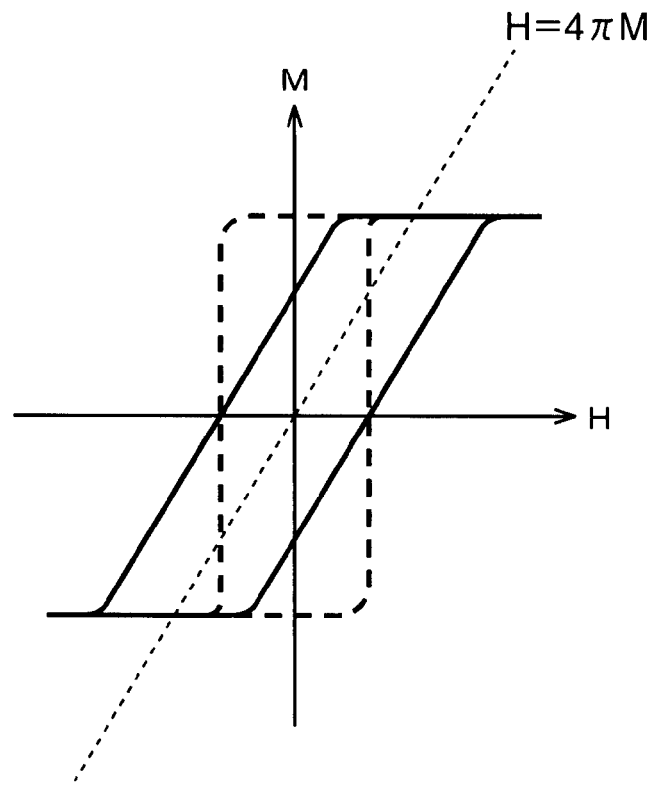
FIG. 25 is a view showing a recording/reproducing characteristic of the conventional magnetic recording medium.
Figure 26:
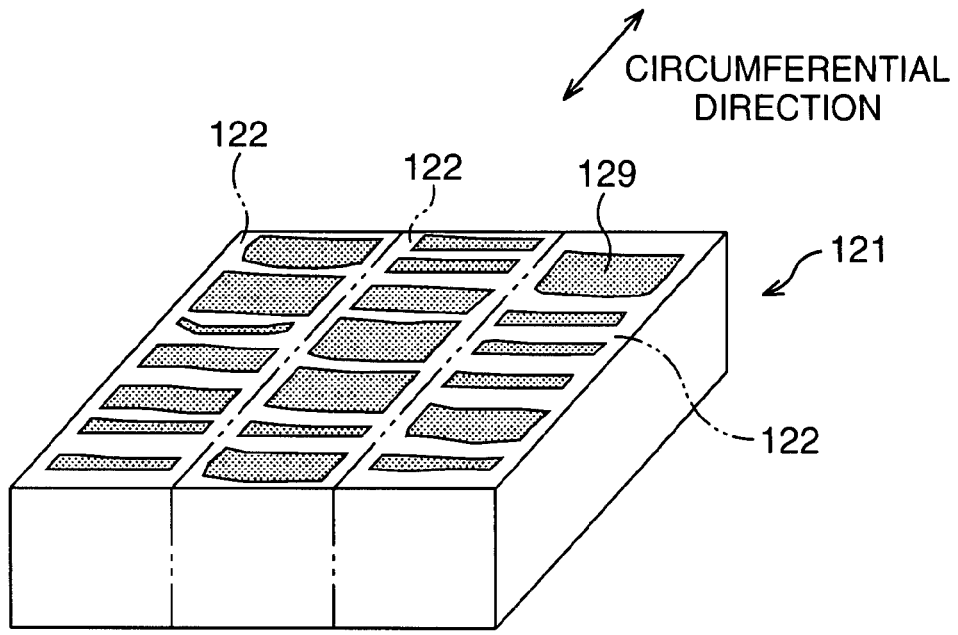
FIG. 26 is a view showing a conventional recording medium.
Figure 27:
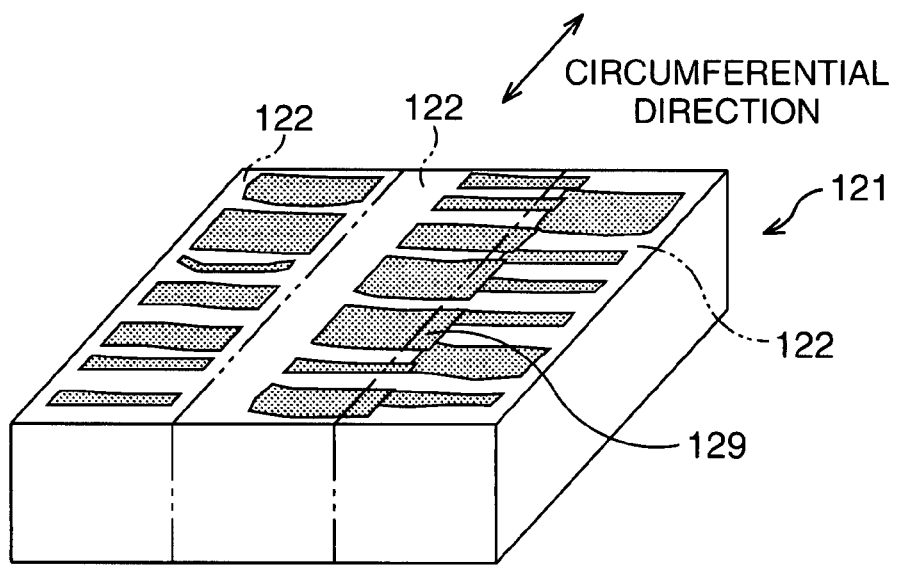
FIG. 27 is a view showing a problem of the conventional recording medium.
Figure 28:
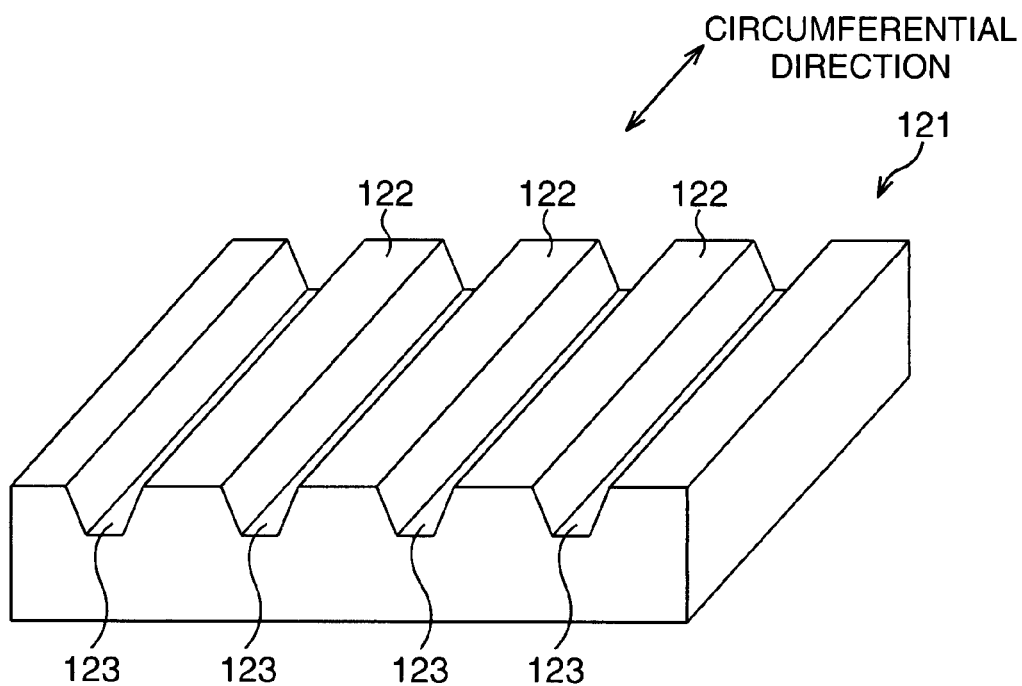
FIG. 28 is a view showing a first example of a discrete track medium.

Note that, as for the fourth embodiment, the DC erased portion 42 may be made to the AC erased portion 43 as in the third embodiment. In this case, as shown in FIG. 21, just a selective AC erase process (step S10) is performed to the DC erased portion 42 before the formatting (step S4). By performing the process as described above, the effects of the third and fourth embodiments can be obtained.

Figure 29:
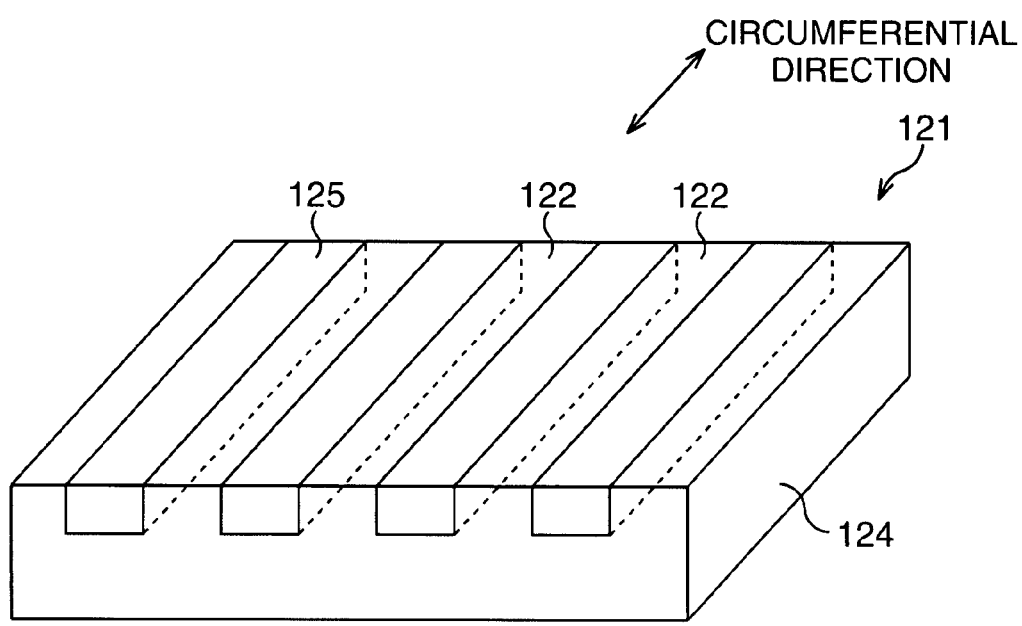
FIG. 29 is a view showing a second example of the discrete track medium.
Figure 30:
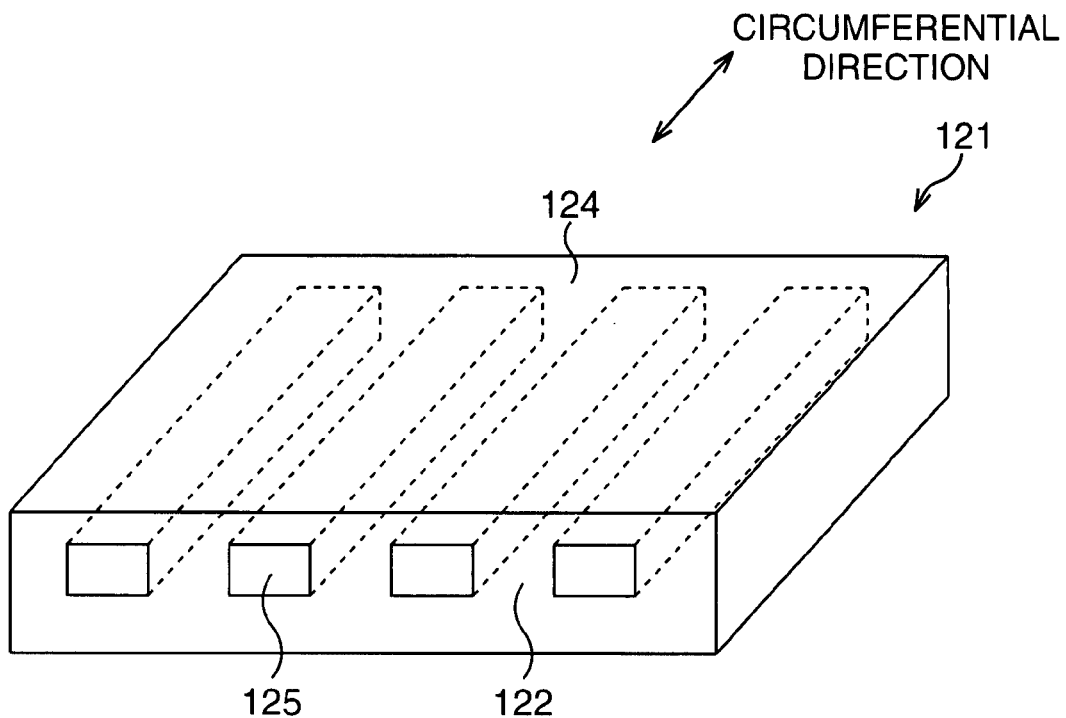
FIG. 30 is a view showing a third example of the discrete track medium.
Figure 31:
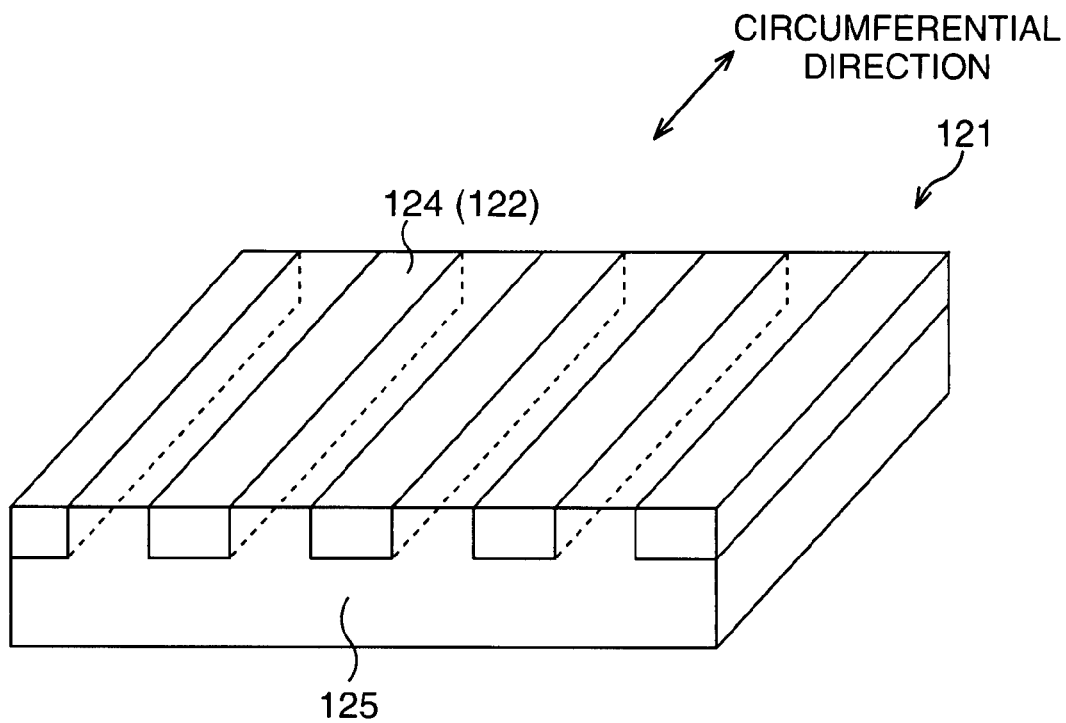
FIG. 31 is a view showing a fourth example of the discrete track medium.
Figure 32:
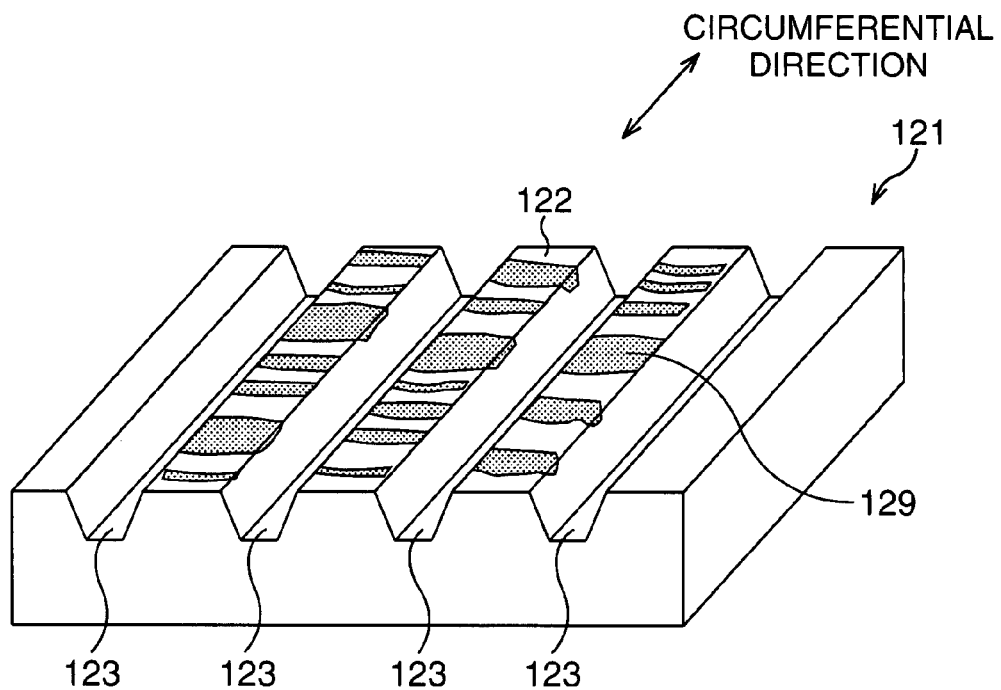
FIG. 32 is a view showing an effect of the first example of the discrete track medium.
Figure 33:
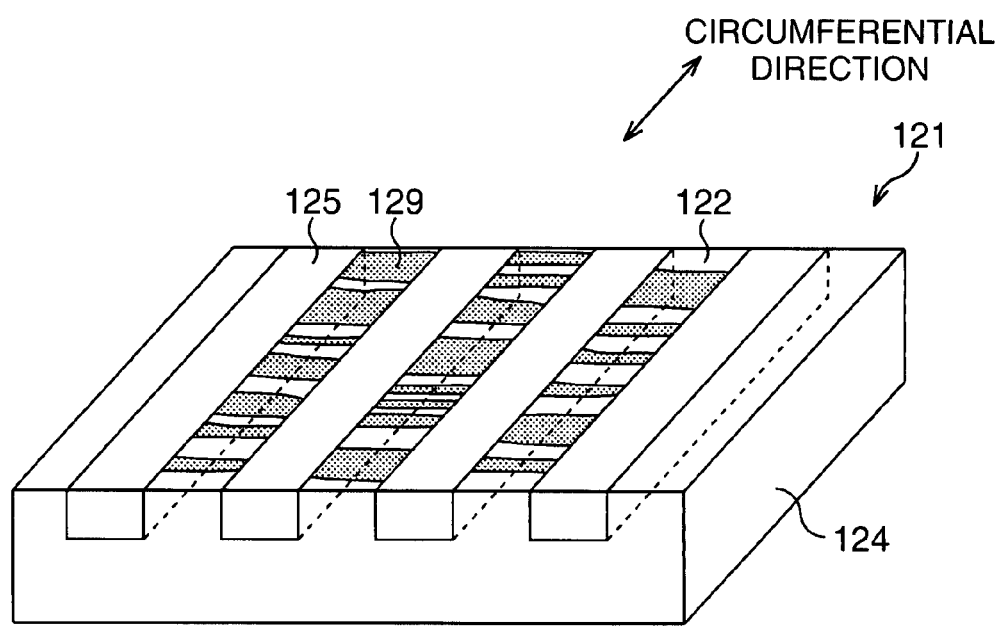
FIG. 33 is a view showing an effect of the second example of the discrete track medium.
Figure 34:
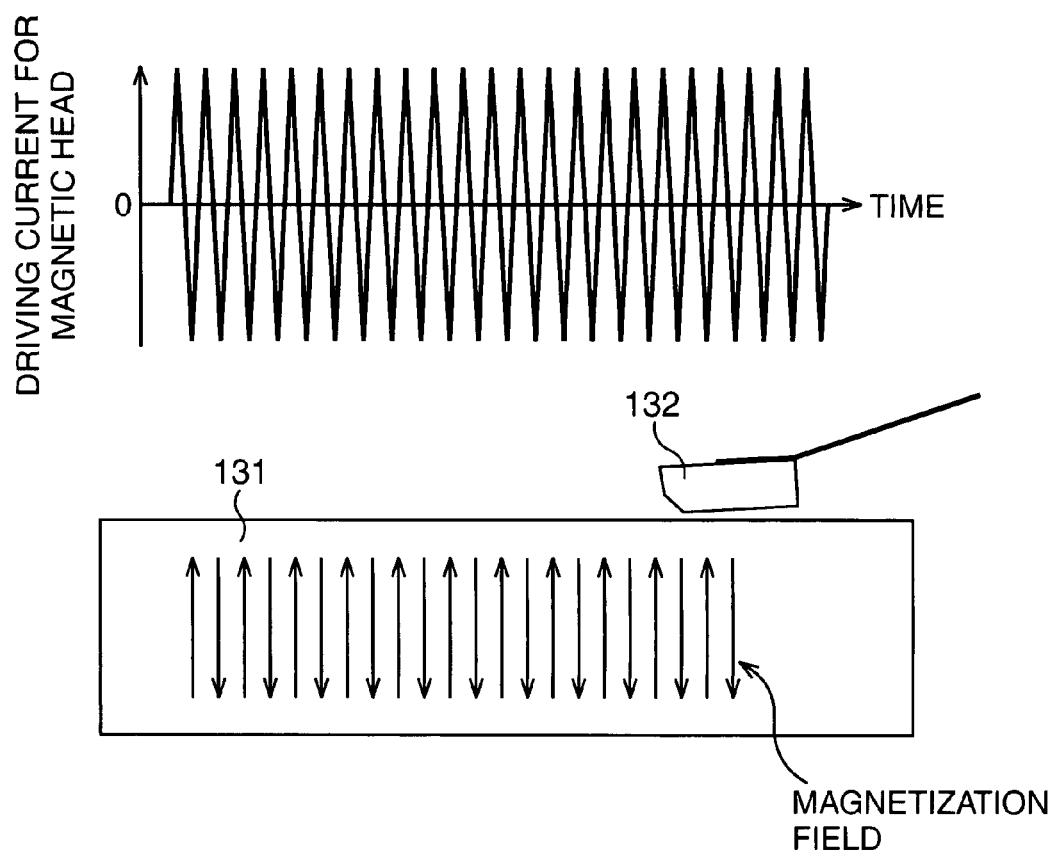
FIG. 34 is a view showing an outline of the AC erase process.
Figure 35:
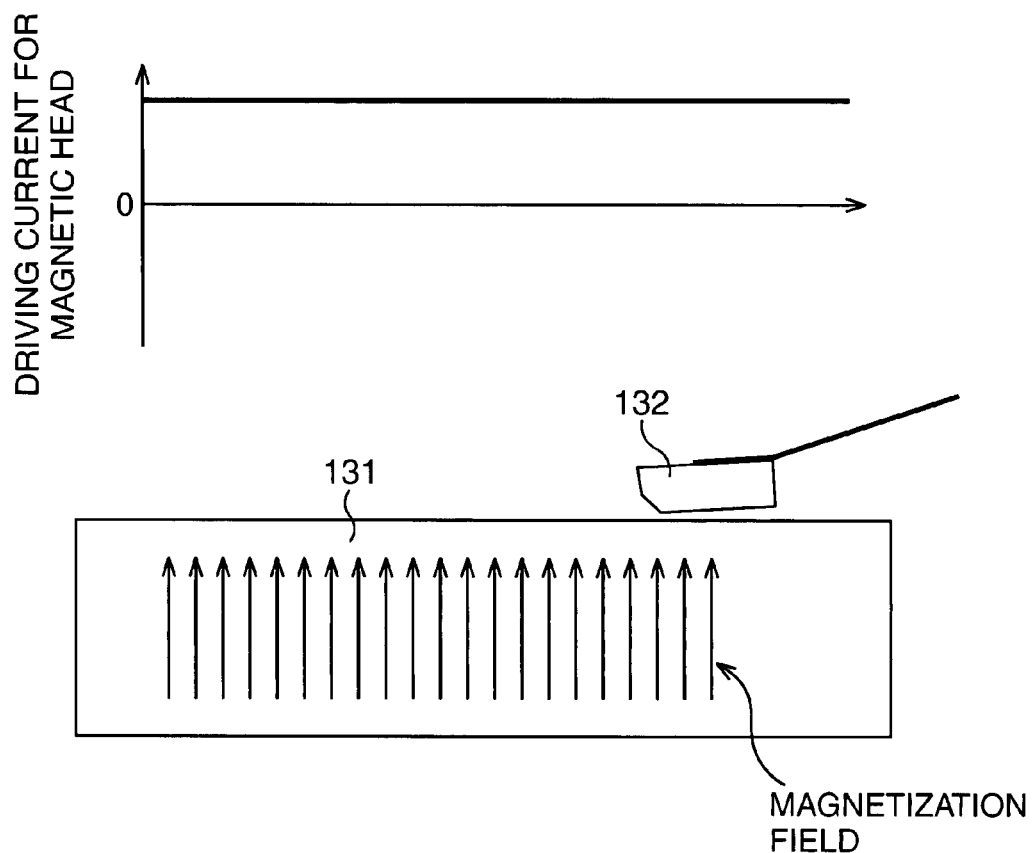
FIG. 35 is a view showing an outline of the DC erase process.
Figure 36:
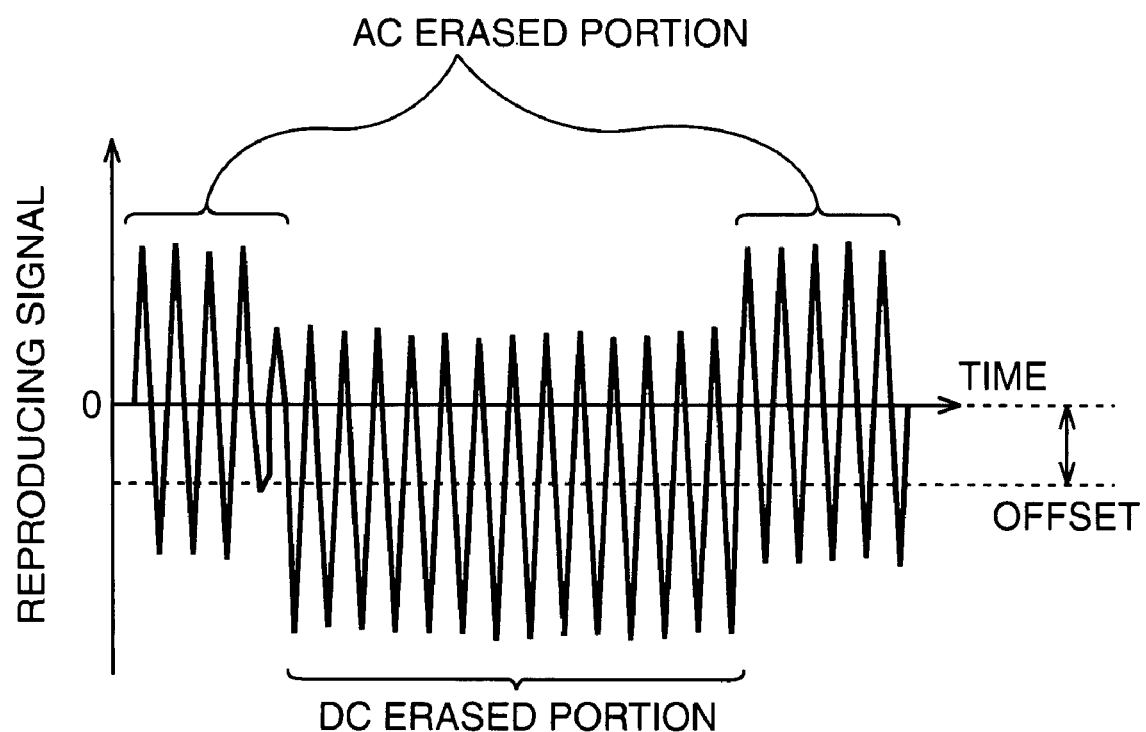
FIG. 36 is a view showing a reproduction signal at an AC erased portion and a DC erased portion.

Further, in these embodiments, when forming the discrete track medium, it is designed that the track groove portion 31 is used, however, a discrete track medium of a structure combining the magnetic portion and the nonmagnetic portion as shown in FIGS. 29 to 31 may be formed. Further, a discrete track medium of a structure combining materials having mutually different magnetic characteristic such as coercive force may be formed. In other words, without regard to the type of the discrete track medium, the present invention can be effected.

According to the present invention, offset in the recording tracks can be prevented, and the servo pattern can be detected surely. Accordingly, even if a discrete track medium is in use, the highly-precise tracking servo control can be performed, so that higher recording density can be realized.

In should be noted that any of the above-described embodiments are merely concrete examples to implement the present invention, and it is to be understood that the technical scope of the present invention will not be construed restrictive by these embodiments. In other words, the present invention can be realized in various forms without departing from the technological spirit and the main features thereof.

What is claimed is:

1. A perpendicular magnetic recording medium comprising:
   a plurality of recording tracks extending in parallel with each other, an AC erase process having been performed to said recording tracks; and
   a servo pattern intervening in each of said recording tracks, a DC erase process having been performed to said servo pattern.

2. The perpendicular magnetic recording medium according to claim 1, further comprising a discrete portion magnetically separating said plurality of recording tracks from each other.

3. The perpendicular magnetic recording medium according to claim 1, wherein said servo pattern includes:
   a preamble portion extending in a direction crossing a direction in which said recording tracks extend; and
   a pit portion positioned rearward of said preamble portion in respect of a moving direction of a reproduction head reading out information recorded in said recording tracks.

4. The perpendicular magnetic recording medium according to claim 1, further comprising a second servo pattern provided between said recording tracks and said servo pattern and recorded magnetic servo control information, an AC erase process having been performed to said second servo pattern.

5. The perpendicular magnetic recording medium according to claim 4, wherein
   a magnetic characteristic of a material composing said second servo pattern is substantially the same as a magnetic characteristic of a material of an area surrounding said second servo pattern, and
   said second servo pattern and the area surrounding said second servo pattern are substantially plane.

6. A perpendicular magnetic recording medium comprising:
   a plurality of recording tracks extending in parallel with each other; and
   a servo pattern intervening in each of said recording tracks, a magnetic servo information having been recorded to said servo pattern, and an AC erase process having been performed to said recording tracks and said servo pattern.

7. A magnetic recording device comprising:
   a perpendicular magnetic recording medium having:
      a plurality of recording tracks extending in parallel with each other, an AC erase process having been performed to said recording tracks; and
      a servo pattern intervening in each of said recording tracks, a DC erase process having been performed to said servo pattern; and
   a magnetic head recording information into said perpendicular magnetic recording medium and reproducing information from said perpendicular magnetic recording medium.

8. A magnetic recording device comprising:
   a perpendicular magnetic recording medium having:
      a plurality of recording tracks extending in parallel with each other; and
      a servo pattern intervening in each of said recording tracks, a magnetic servo information having been recorded to said servo pattern, and an AC erase process having been performed to said recording tracks and said servo pattern; and
   a magnetic head recording information into said perpendicular magnetic recording medium and reproducing information from said perpendicular magnetic recording medium.

9. A manufacturing method of a perpendicular magnetic recording medium, comprising the steps of:
   forming a plurality of recording tracks extending in parallel with each other and a servo pattern intervening in each of said recording tracks;
   performing a DC erase process to said recording tracks and said servo pattern; and
   performing an AC erase process to said recording track.

10. The manufacturing method of a perpendicular magnetic recording medium according to claim 9, wherein the step of forming a plurality of recording tracks includes the step of forming a discrete portion magnetically separating said plurality of recording tracks from each other.

11. The manufacturing method of a perpendicular magnetic recording medium according to claim 9, wherein the step of forming a servo pattern includes the step of forming a preamble portion extending in a direction crossing an extending in which said recording tracks extends, and a pit portion positioned rearward of said preamble portion in respect of moving direction of a reproduction head reading out information recorded in said recording tracks.

12. The manufacturing method of a perpendicular magnetic recording medium according to claim 9, wherein,
in the step of performing an AC erase process, the AC erase process is also performed to an area between said recording tracks and said servo pattern, and
the manufacturing method further comprises the step of recording magnetic servo control information as a second servo pattern in said area between said recording tracks and said servo pattern, to which said AC erase process has been performed.

13. The manufacturing method of a perpendicular magnetic recording medium according to claim 12, wherein
said area recorded said servo control information and its surrounding area are made to have a same magnetic characteristic, and
said area recorded said servo control information and its surrounding area are made to be substantially plane.

14. The manufacturing method of the perpendicular magnetic recording medium according to claim 12, further comprising the step of performing an AC erase process to said servo pattern after said magnetic servo control information is recorded.

15. The manufacturing method of a perpendicular magnetic recording medium according to claim 12, further comprising the step of performing a test writing to said recording tracks while a tracking control is performed based on said servo pattern, before the step of recording said magnetic servo control information,
wherein a position of a recording head is controlled based on a result of said test writing in the step of recording said servo control information.

* * * * *